United States Patent
Yoshida

(10) Patent No.: US 7,832,639 B2
(45) Date of Patent: Nov. 16, 2010

(54) INFORMATION PROCESSING DEVICE

(75) Inventor: Kenji Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 991 days.

(21) Appl. No.: 11/642,282

(22) Filed: Dec. 19, 2006

(65) Prior Publication Data
US 2007/0170255 A1    Jul. 26, 2007

(30) Foreign Application Priority Data

| | | | |
|---|---|---|---|
| Dec. 19, 2005 | (JP) | | 2005-364899 |
| Dec. 26, 2005 | (JP) | | 2005-372548 |
| Jan. 10, 2006 | (JP) | | 2006-002804 |
| Mar. 7, 2006 | (JP) | | 2006-061068 |

(51) Int. Cl.
*G06K 7/00* (2006.01)

(52) U.S. Cl. ................ 235/439; 235/441

(58) Field of Classification Search ........... 235/439, 235/441, 451; 361/737
See application file for complete search history.

(56) References Cited

U.S. PATENT DOCUMENTS

| | | | | |
|---|---|---|---|---|
| 6,712,277 | B2 * | 3/2004 | Spencer | 235/492 |
| 6,725,291 | B2 * | 4/2004 | Lai et al. | 710/16 |
| 7,312,942 | B2 * | 12/2007 | Choi et al. | 360/69 |
| 2001/0016884 | A1 | 8/2001 | Sato et al. | |
| 2003/0223486 | A1 | 12/2003 | Hsu | |
| 2005/0033917 | A1 * | 2/2005 | Takeuchi | 711/115 |

FOREIGN PATENT DOCUMENTS

| | | |
|---|---|---|
| JP | 10-322914 A | 12/1998 |
| JP | 2001-034440 | 2/2001 |
| JP | 2004-355476 | 12/2004 |

OTHER PUBLICATIONS

European Search Report issued Sep. 5, 2007 in European Patent Application 06256417.4.

* cited by examiner

*Primary Examiner*—Ahshik Kim
(74) *Attorney, Agent, or Firm*—Nutter McClennen & Fish LLP; John J. Penny, V

(57) ABSTRACT

An information processing device has a data recording medium accessor, into which a data recording medium is inserted. The data recording medium has first and second operation modes. The information processing device accesses the data recording medium to execute an access type selected by a user in an operation mode having a faster communication speed. If the access to the data recording medium has failed and if the selected access type is a collective data exchange, the information processing device selects a fastest communication speed out of communication speeds at which there is a possibility that data is correctly exchanged in the first operation mode and the second operation mode, and accesses the data recoding medium again. If the access to the data recording medium has failed and if the selected access type is not a collective data exchange, the information processing device reduces the communication speed in the current operation mode, and accesses the data recording medium again.

9 Claims, 25 Drawing Sheets

| BIT 2 TO BIT 0 | DEVICE SPEED |
|---|---|
| 0 | RESERVED |
| 1 | 250ns |
| 2 | 200ns |
| 3 | 150ns |
| 4 | 100ns |
| 5 | RESERVED |
| 6 | RESERVED |
| 7 | EXTENDED |

FIG. 7

| b7 | b6 | b5 | b4 | b3 | b2 | b1 | b0 |
|---|---|---|---|---|---|---|---|
| EXT | FIXED-POINT PART | | | | EXPONENT PART | | |

FIG. 8

| FIXED-POINT PART | MANTISSA | FIXED-POINT PART | MANTISSA |
|---|---|---|---|
| 0 | RESERVED | 8 | 3.5 |
| 1 | 1.0 | 9 | 4.0 |
| 2 | 1.2 | 10 | 4.5 |
| 3 | 1.3 | 11 | 5.0 |
| 4 | 1.5 | 12 | 5.5 |
| 5 | 2.0 | 13 | 6.0 |
| 6 | 2.5 | 14 | 7.0 |
| 7 | 3.0 | 15 | 8.0 |

FIG. 9

| BIT 7 TO BIT 4 | DEVICE TYPE | |
| --- | --- | --- |
| 0 | DTYPE_NULL | NO DEVICE |
| 1 | DTYPE_ROM | MASKED ROM |
| 2 | DTYPE_OTPROM | ONE-TIME PROM |
| 3 | DTYPE_EPROM | UV EPROM |
| 4 | DTYPE_EEPROM | EEPROM |
| 5 | DTYPE_FLASH | FLASH MEMORY |
| 6 | DTYPE_SRAM | SRAM |
| 7 | DTYPE_DRAM | DRAM |
| 8~C | — | RESERVED |
| D | DTYPE_IO | I/O |
| E | DTYPE_EXTEND | EXTENDED |
| F | — | RESERVED |

FIG. 10

| CARD FUNCTION CODE | CARD FUNCTION | CARD FUNCTION CODE | CARD FUNCTION |
| --- | --- | --- | --- |
| 0 | MULTIFUNCTION CARD | 9 | SECURITY CARD |
| 1 | MEMORY CARD | 0x0A | INSTRUMENT CARD |
| 2 | SERIAL PORT CARD | 0x0B | HIGH-SPEED SERIAL BUS ADAPTER (USB/IEEE1394) |
| 3 | PARALLEL PORT CARD | | |
| 4 | FIXED DISK | 0x0C ~ 0xFD | RESERVED |
| 5 | VIDEO CARD | | |
| 6 | NETWORK ADAPTER CARD | 0xFE | VENDOR DEFINITION |
| 7 | AIMS CARD | 0xFF | UNUSABLE |
| 8 | SCSI CARD | | |

FIG. 11

| CYCLE TIME |
|---|
| 250ns |
| (150ns) |
| 120ns |
| 100ns |
| 80ns |

CYCLE TIME IN MEMORY MODE

FIG. 21

| PIO MODE | CYCLE TIME |
|---|---|
| PIO MODE 0 | 600ns |
| PIO MODE 1 | 383ns |
| PIO MODE 2 | 240ns |
| PIO MODE 3 | 180ns |
| PIO MODE 4 | 120ns |
| PIO MODE 5 | 100ns |
| PIO MODE 6 | 80ns |

CYCLE TIME IN PIO MODE OF
TrueIDE MODE

FIG. 22

INFORMATION PROCESSING DEVICE

CROSS REFERENCE TO RELATED APPLICATION

This application claims benefit of priority under 35 U.S.C.§119 to Japanese Patent Applications No. 2005-364899, filed on Dec. 19, 2005, No. 2005-372548, filed on Dec. 26, 2005, No. 2006-002804, filed on Jan. 10, 2006, and No. 2006-061068, filed on Mar. 7, 2006, the entire contents of which are incorporated by reference herein.

BACKGROUND OF THE INVENTION

1. Field of the Invention

The present invention relates to an information processing device, and particularly relates to an information processing device which exchanges data with a card-type medium such as a data recording medium in plural operation modes.

2. Related Background Art

Among card-type media to store data and communicate data in an information processing device such as a personal computer, there is a CF (compact flash) card. In the information processing device which supports the CF card, a card slot for the CF card is provided, and the information processing device can access the CF card by an user inserting the CF card into the card slot.

The CF card supports three operation modes: memory mode, TrueIDE mode, and card I/O mode. The memory mode and the TrueIDE mode are operation modes prepared for a memory card. The card I/O mode is an operation mode added to support an I/O card which is the standard called CF+ developed from the memory card.

When the CF card is the memory card, the CF card supports both of the operation modes: memory mode and TrueIDE mode, but when the CF card is the I/O card, the CF card does not support the TrueIDE mode.

Therefore, the information processing device needs to access the CF card in any of these three operation modes, but if the CF card is used as the memory card, access in the TrueIDE mode is sometimes desirable since the data transfer rate is sometimes higher in the TrueIDE mode than in the memory mode.

However, it is not known whether the inserted CF card is the memory card which supports the memory mode and the TrueIDE mode or the I/O card which supports the card I/O mode even if the information processing device accesses the CF card in the TrueIDE mode, so that the CF card needs to be accessed in the memory mode. If the CF card which does not support the TrueIDE mode is accessed in the TrueIDE mode, the CF card, of course, does not operate normally.

Therefore, in order to check whether the CF card inserted into the card slot is the memory card which supports the memory mode and the TrueIDE mode or the I/O card which supports the card I/O mode, it is necessary to access the CF card in the memory mode and read CIS (Card Information Structure) information as card attribute information held in the CF card. The CIS information as the card attribute information cannot be read by accessing the CF card in the TrueIDE mode, and it is necessary to access the CF card in the memory mode or the card I/O mode. It is further necessary to judge whether or not the CF card is the memory card which supports the TrueIDE mode based on the CIS information, and, if not, perform an operation such as stopping data transfer processing after displaying an error message.

Needless to say, a method of accessing the CF card in the TrueIDE mode from the beginning without performing the above judgment is conceivable (for example, Japanese Patent Application Laid-open No. 2004-355476). This method is beneficial when the CF card is used instead of a hard disk drive by incorporating a micro drive conforming to specifications of the CF card in the information processing device. In this case, information on the micro drive is known in advance, and the micro drive is never replaced as the CF card by the user, so that no problem arises even if the operation mode is fixed to the TrueIDE mode. On the other hand, when the CF card is replaced in the card slot at the user's discretion, there is a possibility that various kinds of CF cards are inserted, so that the operation mode cannot be fixed to the TrueIDE mode.

Accordingly, it is necessary to shift to the TrueIDE mode after once accessing the CF card in the memory mode, reading the CIS information, and confirming whether the card supports the TrueIDE mode. Note, however, that to shift from the memory mode to the TrueIDE mode, it is necessary to temporarily turn off the power of the CF card and turn on the power again after an OE signal is fixed to a ground level. This is because the CF card is designed so as to get up and running in the TrueIDE mode if a ninth pin to which the OE signal is supplied is a ground when the power is turned on and get up and running in the memory mode if not so.

However, even if the power of the CF card is temporarily turned off, there arises a problem that the voltage of a power line which is supplying the power does not fall soon since the load of the CF card is light, and thereby the user's waiting time becomes longer. Although the specific fall time varies according to the type of the CF card, for example, several hundred milliseconds to about two seconds are needed.

In particular, when still image data, moving image data, music data, or the like stored in the CF card is reproduced, the user tends to feel the waiting time long. For example, if the fall time of the power becomes longer when the still image data stored in the CF card is read and thumbnail images are displayed on a display screen, the time from the manipulation of the user to the display of the first thumbnail image becomes longer, which may cause user discomfort.

Such a problem that a long time is required when the power of the CF card is turned off arises not only when the operation mode of the CF card is switched but also simply when the power of the CF card is turned off and the CF card is pulled out. Further, such a problem can arise also when the power of any other type of card-type medium is turned off in addition to the case of the CF card.

Moreover, if the above processing is performed after the need for reading data from the CF card or the need for writing data into the CF card arises, the time until the reading and writing of data from/to the CF card is enabled increases, and consequently the waiting time becomes longer. In particular, when the still image data, moving image data, music data, or the like stored in the CF card is reproduced, the user tends to feel the waiting time long.

For example, when the still image data stored in the CF card is read and thumbnail images are displayed on the display screen, if the time until the data can be read from the CF card becomes longer, the time from the manipulation of the user to the display of the first thumbnail image becomes longer, which may cause user discomfort. Such a problem arises not only in the CF card but also in any card-type medium which needs to read card information before access.

Further, in part of CF cards, the communication speed in the memory mode is sometimes faster than that in the TrueIDE mode, and in such a case, the exchange of data with the CF card in the memory mode can shorten the data transfer time.

Furthermore, it is known that in some cases, even if the CF card is accessed at a communication speed supposed to be capable of normal data exchange, a communication error occurs, and thereby data can not be exchanged normally. It is also known that such a situation occurs because there are various manufacturers and types of CF cards, and depending on the manufacturer and the type, the CF card does not support the communication speed which is supposed to be supported or there is a mismatch with a driver. However, in such a case, if the CF card cannot be used, the user is inconvenienced, which is undesirable. Such a problem can arise not only in the CF card but also other types of data recording media.

SUMMARY OF THE INVENTION

In order to accomplish the aforementioned and other objects, according to one aspect of the present invention, a control method of an information processing device comprising a data recording medium accessor, into which a data recording medium is inserted to access the inserted data recording medium, the data recording medium having a first operation mode and a second operation mode as operation modes, the first operation mode having one or plural communication speeds and the second operation mode having one or plural communication speeds, comprises the steps of:

causing a user to select an access type to access the data recording medium inserted into the data recording medium accessor;

accessing the data recording medium to execute the access type selected by the user in an operation mode having a faster communication speed out of the first operation mode and the second operation mode;

if the access to the data recording medium has failed and if the access type selected by the user is a type in which data is collectively exchanged, selecting a fastest communication speed out of communication speeds at which there is a possibility that data is correctly exchanged in the first operation mode and the second operation mode, and accessing the data recoding medium to execute the access type selected by the user at the selected communication speed in one of the first operation mode and the second operation mode again; and if the access to the data recording medium has failed and if the access type selected by the user is not the type in which data is collectively exchanged, reducing the communication speed in the current operation mode, and accessing the data recording medium to execute the access type selected by the user at the reduced communication speed in the current operation mode again.

According to another aspect of the present invention, an information processing device, comprises:

a data recording medium accessor, into which a data recording medium is inserted to access the inserted data recording medium, the data recording medium having a first operation mode and a second operation mode as operation modes, the first operation mode having one or plural communication speeds and the second operation mode having one or plural communication speeds;

a selector which causes a user to select an access type to access the data recording medium inserted into the data recording medium accessor;

a first accessor which accesses the data recording medium to execute the access type selected by the user in an operation mode having a faster communication speed out of the first operation mode and the second operation mode;

a second accessor which, if the access by the first accessor has failed and if the access type selected by the user in the selector is a type in which data is collectively exchanged, selects a fastest communication speed out of communication speeds at which there is a possibility that data is correctly exchanged in the first operation mode and the second operation mode, the second accessor accessing the data recoding medium to execute the access type selected by the user at the selected communication speed in one of the first operation mode and the second operation mode again; and a third accessor which, if the access by the first accessor has failed and if the access type selected by the user in the selector is not the type of access in which data is collectively exchanged, reduces the communication speed in the current operation mode, the third accessor accessing the data recording medium to execute the access type selected by the user at the reduced communication speed in the current operation mode again According to a further aspect of the present invention, a control method of an information processing device including a data recording medium accessor into which a data recording medium is inserted, comprises the steps of:

acquiring a first communication speed which is a communication speed when data is exchanged with the data recording medium in a first operation mode;

acquiring a second communication speed which is a communication speed when data is exchanged with the data recording medium in a second operation mode;

judging which of the first communication speed and the second communication speed is faster; and exchanging data with the data recording medium in an operation mode with a communication speed judged to be a faster out of the first operation mode and the second operation mode.

BRIEF DESCRIPTION OF THE DRAWINGS

FIG. 7 is a correspondence table between values of three bits from bit 2 to bit 0 of a device ID in a CISTPL_DEVICE tuple in CIS information read from a CF card and device speeds;

FIG. 8 is a table to define the extended device speed when the device ID is an extended device;

FIG. 9 is a correspondence table between values of a fixed-point part determined in FIG. 8 and mantissas;

FIG. 10 is a correspondence table between values of four bits from bit 7 to bit 4 of the device ID in the CISTPL_DEVICE tuple and device types;

FIG. 11 is a correspondence table between values of a card function code in a CISTPL_FUNCID tuple and card functions;

FIG. 21 is a list of cycle times supported in the memory mode;

FIG. 22 is a list of cycle times supported in a PIO mode of the TrueIDE mode;

DETAILED DESCRIPTION OF THE EMBODIMENTS

Embodiments of the present invention will be described below with reference to the drawings. It should be noted that the embodiments described below are not intended to limit the construction of the present invention.

First Embodiment

Figure 1:
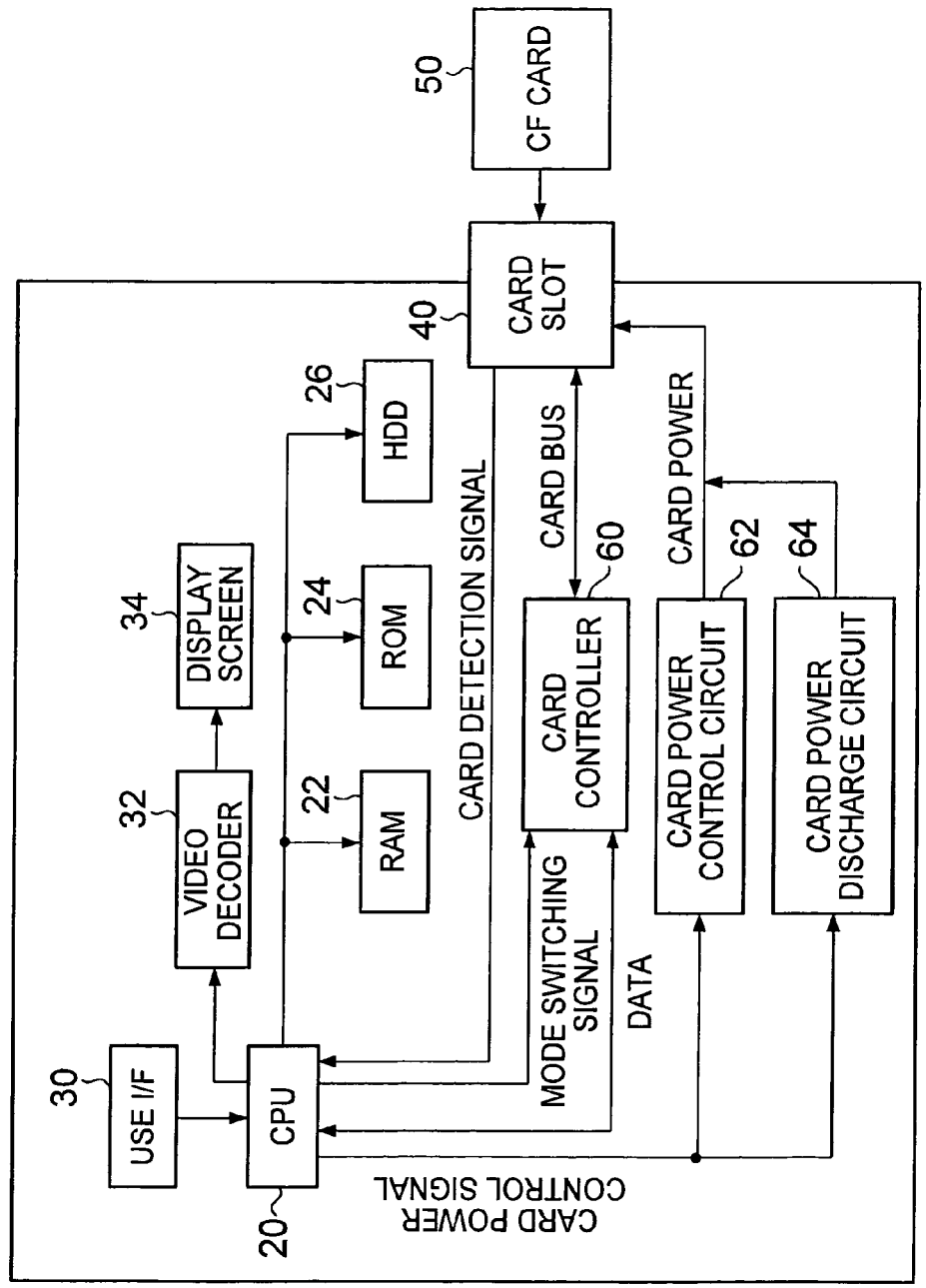
FIG. 1 is a block diagram for explaining the internal configuration of an information processing device according to an embodiment of the present invention.

FIG. 1 is a block diagram for explaining an example of the internal configuration of an information processing device 10 according to this embodiment. The information processing device 10 is one of various information processing devices each including a card slot, for example, a small-sized portable information terminal or digital camera, a notebook or desktop computer, or the like.

As shown in FIG. 1, the information processing device 10 according to this embodiment includes a CPU (Central Processing Unit), a RAM (Random Access Memory) 22, a ROM (Read Only Memory) 24, a hard disk drive 26, a user interface 30, a video decoder 32, and a display screen 34.

The CPU 20, the RAM 22, the ROM 24, and the hard disk drive 26 are interconnected via an internal bus. Therefore, the CPU 20 can arbitrarily access these RAM 22, ROM 24, and hard disk drive 26 via the internal bus.

Image data is outputted from the CPU 20 to the video decoder 32, decoded by the video decoder 32, and displayed on the display screen 34. This display screen 34 is constituted by an LCD (Liquid Crystal Display), a CRT (Cathode Ray Tube), or the like.

Various user's manipulation instructions are inputted to the CPU 20 from the user interface 30. This user interface 30, for example, can be constituted by one or plural buttons, a keyboard, a pointing device, or the like, or can be constituted by a combination thereof. In the example in FIG. 1, the user interface 30 is provided in the information processing device 10 itself, but this user interface 30 may be provided outside the information processing device 10. In the CPU 20, various kinds of processing are performed based on the manipulation instructions from the user interface 30.

Further, in the information processing device 10 according to this embodiment, a card slot 40 is provided. In this embodiment, a CF card 50 is inserted into this card slot 40 by the user. Accordingly, any of various kinds of CF cards 50 is inserted into the card slot 40 by the user, and namely any of the CF cards 50 which support various modes is inserted.

In particular, in this embodiment, with respect to the CF card 50 inserted into the card slot 40, it is assumed that there are two cases: one is when it is a memory card which is operable both in a memory mode and a TrueIDE mode, and the other is when it is an I/O card which is operable both in the memory mode and a card I/O mode. Of course, if a standard other than the above is set, a new standard CF card may possibly be inserted.

The CF card 50 inserted into the card slot 40 is controlled from the CPU 20 via a card controller 60. Namely, based on a card detection signal outputted from the card slot 40, the CPU 20 judges whether the CF card 50 is inserted into the card slot 40. If the CF card 50 is inserted, the CPU 20 outputs a mode switching signal to the card controller 60 to perform switching between access in the memory mode and access in the TrueIDE mode. Further, when the information processing device 10 supports the card I/O mode, switching to the card I/O mode is also performed by the mode switching signal.

The card controller 60 and the card slot 40 are connected by a card bus, and data is exchanged between the CPU 20 and the CF card 50 inserted into the card slot 40 via the card controller 60.

A card power is supplied to the CF card 50 inserted into the card slot 40 from a card power control circuit 62 via a power line. Whether or not the card power control circuit 62 supplies the card power is controlled based on a card power control signal outputted by the CPU 20. Namely, when the CPU 20 detects that the CF card 50 is inserted or when the CPU 20 tries to access the CF card 50, the CPU 20 outputs the card power control signal to supply the card power to the card power control circuit 62. Contrary to this, when the CPU 20 detects that the CF card 50 is pulled out or when the CPU 20 has got from the state of accessing the card, the CPU 20 outputs the card power control signal to stop the supply of the card power to the card power control circuit 62. For example, in this embodiment, the card power control signal when the card power is supplied is high, whereas the card power control signal when the card power is not supplied is low.

In this embodiment, the card power control signal outputted from the CPU 20 is also supplied to a card power discharge circuit 64. The operation of the card power discharge circuit 64 is turned on/off based on this card power control signal. Namely, in the case of the card power control signal not to supply the card power, the card power discharge circuit 64 goes into an operating state and connects the power line to supply the card power to a ground via a resistor. Therefore, when the card power is switched from on to off, the power line of this card power is forcibly discharged by the discharge circuit 64, and the card power rapidly falls to a ground level. Contrary to this, in the case of the card power control signal to supply the card power, the card power discharge circuit 64 goes into a non-operating state, and the power line of the card power is not connected to the ground. This can avoid a useless current from flowing from the power line to the ground during the supply of the card power.

Incidentally, the conditions under which the card power is turned on and turned off are set variously according to specifications of the information processing device 10 and the CF card 50.

Figure 2:
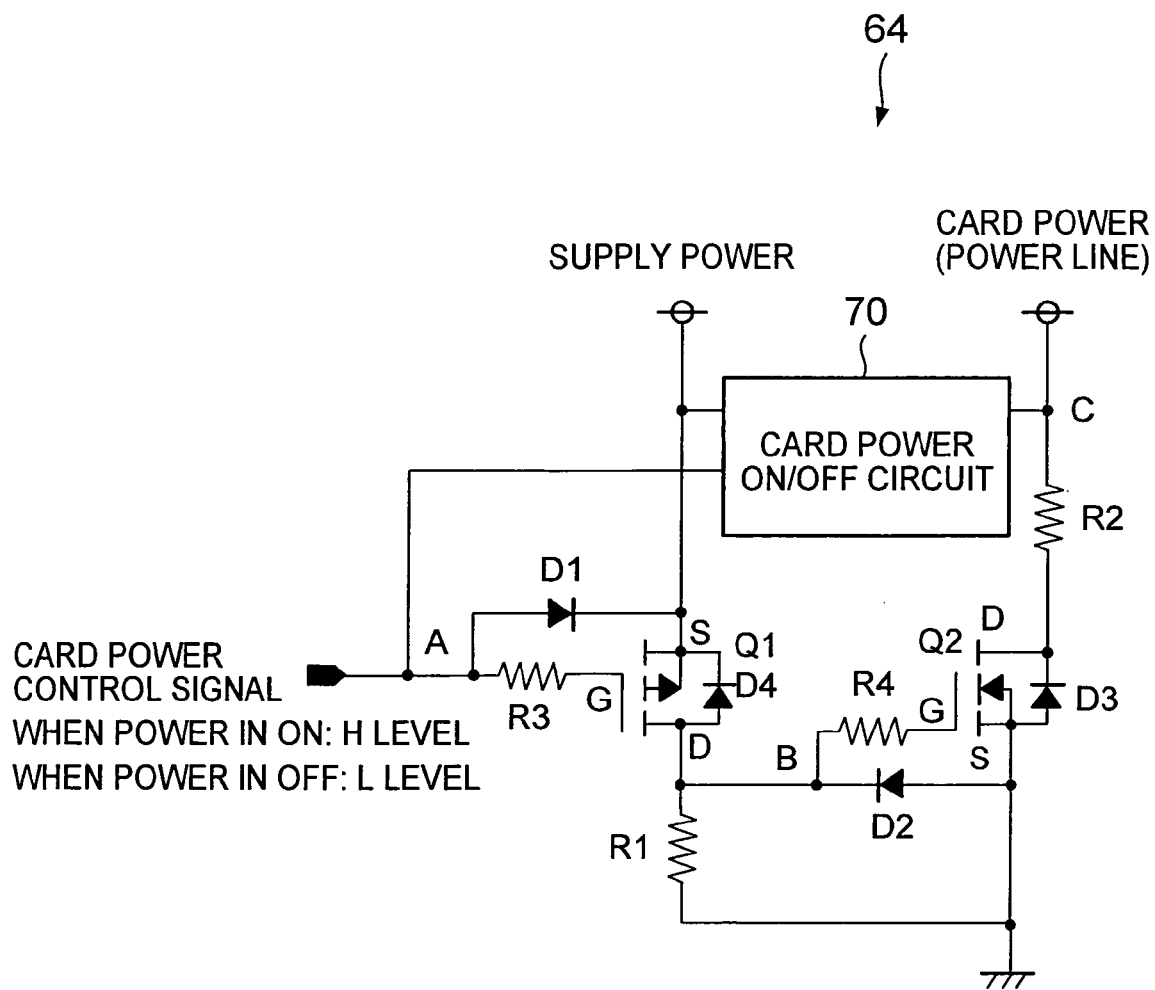
FIG. 2 is a diagram showing an example of the circuit configuration of a card power discharge circuit included in the information processing device in FIG. 1.

FIG. 2 is a diagram showing an example of the circuit configuration of the card power discharge circuit 64 according to this embodiment. As shown in FIG. 2, the card power discharge circuit 64 includes a P-channel MOS transistor Q1, an N-channel MOS transistor Q2, resistors R1 to R4, diodes D1 to D4, and a card power on/off circuit 70.

The P-channel MOS transistor Q1 and the resistor R1 are connected in series between a supply power and the ground. The diode D4 is connected in parallel with this P-channel MOS transistor Q1. The resistor R3 is connected between a node A connected to an input terminal to which the card power control signal is inputted and a gate G of the P-channel MOS transistor Q1.

The resistor R2 and the N-channel MOS transistor Q2 are connected between a node C connected to the power line to supply the card power to the CF card 50 and the ground. The diode D3 is connected in parallel with this N-channel MOS transistor Q2. The resistor R4 is connected between a node B between the P-channel MOS transistor Q1 and the resistor R1 and a gate G of the N-channel MOS transistor Q2. The diode D2 is connected in parallel with this resistor R4.

The card power on/off circuit 70 is connected between the supply power and the card power, and the card power control signal is inputted to the card power on/off circuit 70 from the node A. The card power on/off circuit 70 is a circuit which supplies power from the supply power as the card power to the node C when the card power control signal is high and supplies no power to the node C when the card power control signal is low.

Next, the operation of the card power discharge circuit 64 will be described. First, the operation when the card power control signal is high, that is, when the card power is supplied will be described. When the card power control signal is high, the card power on/off circuit 70 supplies the power supplied from the supply power to the node C. Further, the node A goes high, and the P-channel MOS transistor Q1 is turned off. The node B goes low since it is connected to the ground via the resistor R1, and the N-channel MOS transistor Q2 is also turned off. Hence, the power line is disconnected from the ground, and the power outputted from the card power on/off circuit 70 is supplied as the card power via the power line.

Then, when the card power control signal goes low, that is, when the supply of the card power is stopped, the node A goes low. Therefore, the card power on/off circuit 70 stops the supply of the power from the supply power to the node C. Since the node A goes low, the P-channel MOS--transistor Q1 is turned on, and the node B goes high along with the supply power. When the node B goes high, the N-channel MOS transistor Q2 is also turned on, and the power line to supply the card power is connected to the ground via the resistor R2. Hence, the power line of the card power is forcibly discharged, so that the card power falls in a short period of time. The smaller the resistance value of the resistor R2, the more rapidly the power line is discharged, and consequently the fall time of the card power becomes shorter.

Figure 3:
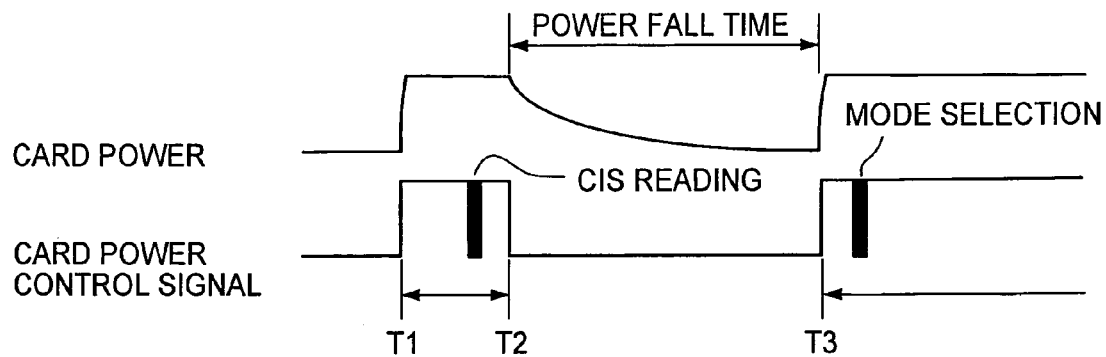
FIG. 3 is a diagram showing an example of operation waveforms of a card power and a card power control signal in the information processing device without the card power discharge circuit.
Figure 4:
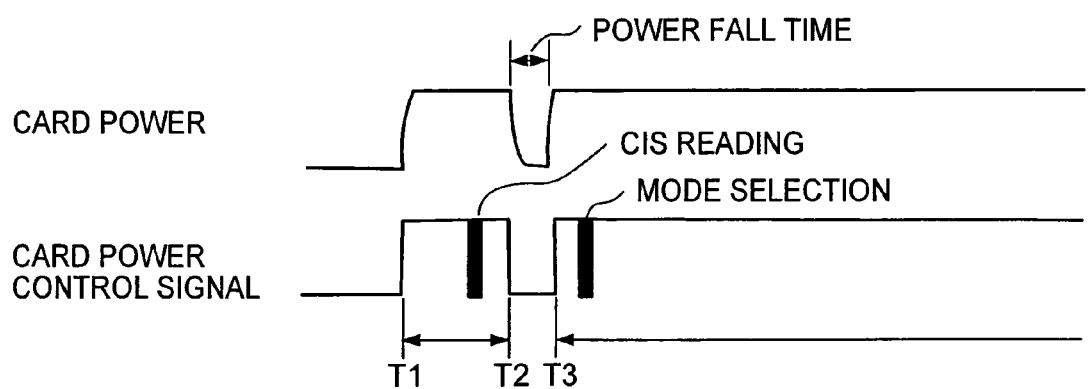
FIG. 4 is a diagram showing an example of operation waveforms of the card power and the card power control signal in the information processing device in FIG. 1.

FIG. 3 is a diagram showing operation waveforms of the card power control signal and the card power in an information processing device without the card power discharge circuit 64, and FIG. 4 is a diagram showing operation waveforms of the card power control signal and the card power in the information processing device 10 with the card power discharge circuit 64.

As shown in FIG. 3, when the CF card 50 is inserted, the CPU 20 drives the card power control signal high at a time T1 to access the CF card in the memory mode and supplies the card power to the CF card 50. Then, the CPU 20 reads CIS information from the CF card 50 in the memory mode. Subsequently, to switch the CF card 50 from the memory mode to the TrueIDE mode, the CPU 20 drives the card power control signal low at a time T2 to stop supply of the card power to the CF card 50. After the time T2, the card power falls in a long period of time since the card power discharge circuit 64 does not exist. Thereafter, the CPU 20 drives the card power control signal high again at a time T3 to start the supply of the card power to the CF card 50, and starts access to the CF card 50 in the TrueIDE mode.

On the other hand, when the card power discharge circuit 64 exists, as shown in FIG. 4, the card discharge circuit 64 forcibly discharges the power line of the card power when the card power control signal is driven low a the time T2, so that the card power falls in a short period of time. This can correspondingly reduce the waiting time of the user who tries to access the CF card 50.

Next, card access processing performed when the information processing device 10 accesses the CF card 50 will be described using FIG. 5 and FIG. 6. This card access processing is realized by the CPU 20 reading and executing a card access program stored in the ROM 24 or the hard disk drive 26. This card access processing is performed when the CPU 20 accesses the CF card 50.

Figure 5:
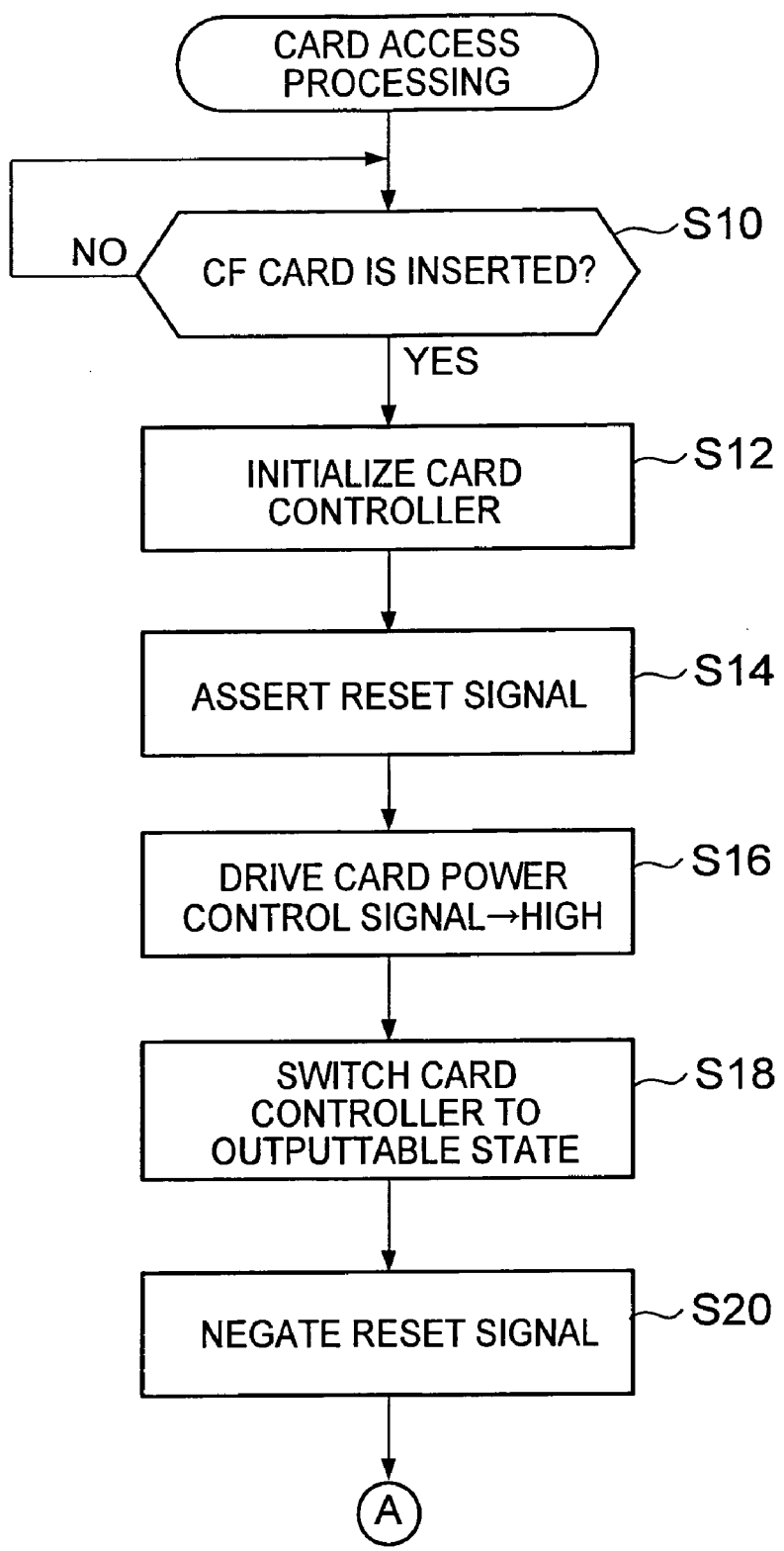
FIG. 5 is a flowchart for explaining an example of card access processing performed by the information processing device shown in FIG. 1 (Part 1)

As shown in FIG. 5, the information processing device 10 judges whether the CF card 50 is inserted into the card slot 40 (step S10). In this embodiment, whether the CF card 50 is inserted into the card slot 40 is judged based on the above card detection signal outputted from the card slot 40. More specifically, when both a CD1 signal and a CD2 signal in the card slot 40 change from high to low, the information processing device 10 judges that the CF card 50 is inserted into the card slot 40. Namely, while the CF card 50 is inserted, these CD1 signal and CD2 signal are low.

When judging in step S10 that the CF card 50 is not inserted (step S10: NO), the information processing device 10 repeats step S10 and stands by until the CF card 50 is inserted into the card slot 40. Incidentally, in this case, it is also possible to give the user notice that the CF card 50 is not inserted into the card slot 40. This notice can be realized, for example, by displaying a message on the display screen 34 or by making a sound.

On the other hand, when judging in step S10 that the CF card 50 is inserted into the card slot 40 (step S10: YES), the information processing device 10 initializes the card controller 60 (step S12).

Then, the information processing device 10 asserts a RESET signal of the CF card 50 (step S14). Subsequently, the information processing device 10 drives the card power control signal high to get the card power up and running (step S16). At this time, it gets the CF card 50 up and running in the memory mode. This step S16 corresponds to the time T1 in FIG. 4.

Then, after waiting until the card power becomes stable, the information processing device 10 switches a card-side interface of the card controller 60 from a high-impedance state to an outputtable state (step S18). Subsequently, the information processing device 10 negates the RESET signal (step S20).

Figure 6:
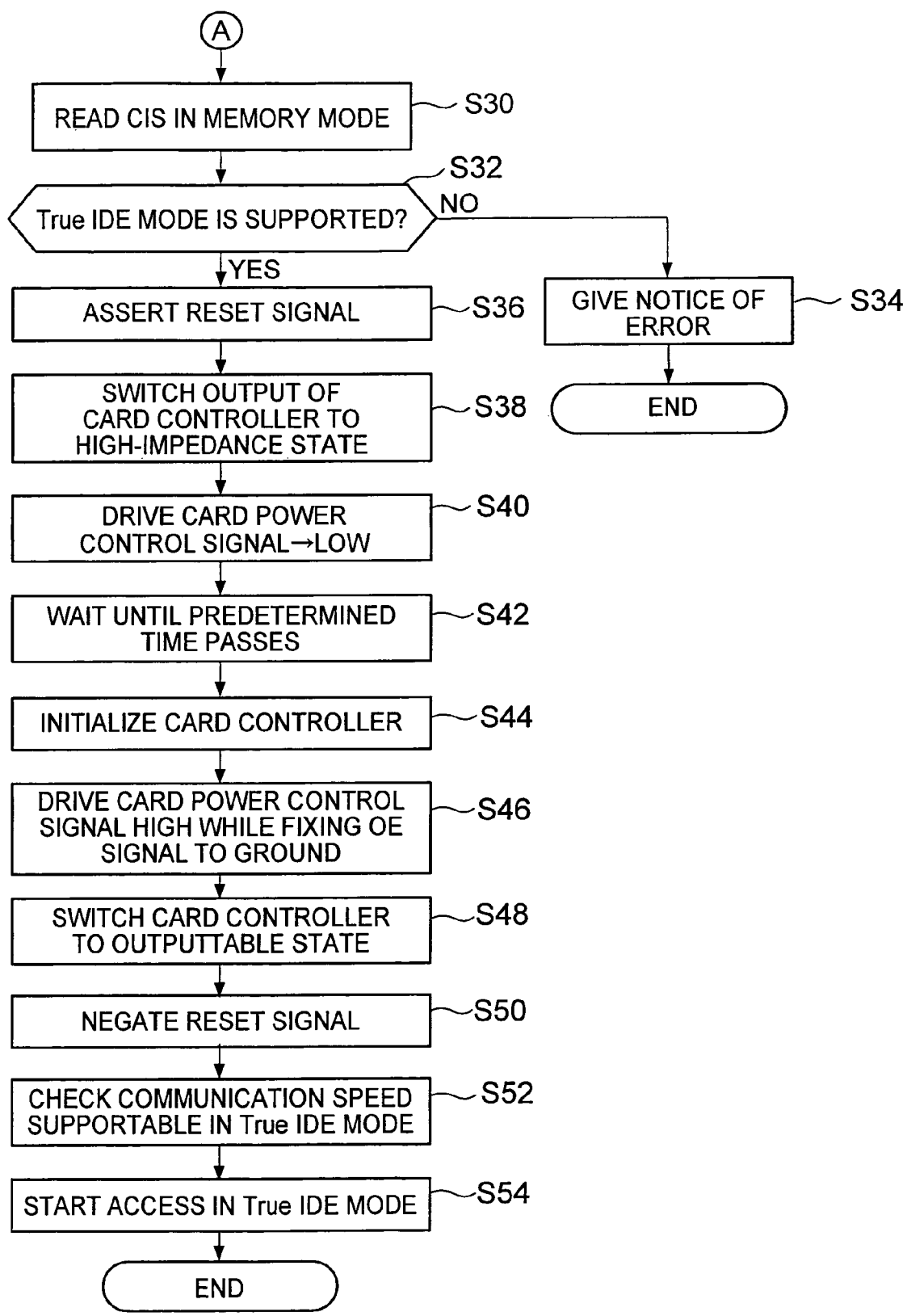
FIG. 6 is a flowchart for explaining the example of the card access processing performed by the information processing device shown in FIG. 1 (Part 2)

Then, as shown in FIG. 6, the information processing device 10 reads the CIS information as card attribute information in the memory mode (step S30).

Subsequently, based on the read CIS information, the information processing device 10 judges whether the inserted CF card 50 supports the TrueIDE mode (step S32). More specifically, the information processing device 10 analyzes a device ID of CISTPL_DEVICE of the CIS information and CISTPL_FUNCID and judges whether the TrueIDE mode is supported.

FIG. 7 is a correspondence table between values of three bits from bit 2 to bit 0 of the device ID in a CISTPL_DEVICE tuple and device speeds. As shown in FIG. 7, it is known that if the value of bit 2 to bit 0 is, for example, 1, the device speed is 250 ns, and if it is 3, the device speed is 150 ns.

If the value of bit 2 to bit 0 of the device ID is 7, an extended device speed in the CISTPL_DEVICE tuple is seen. As shown in FIG. 8, information on the extended device speed is represented by a 4-bit fixed-point part from bit 6 to bit 3 and a 3-bit exponent part from bit 2 to bit 0.

FIG. 9 is a table showing values of a fixed-point part and mantissas corresponding thereto. For example, if the value of the fixed-point part from bit 6 to bit 3 is 4, the mantissa is 1.5, and if the value of the fixed-point part from bit 6 to bit 3 is 9, the mantissa is 4.0. The extended device speed is calculated by "extended device speed (ns)=mantissa×10$^{(value\ of\ exponent\ part)}$".

Further, the information processing device 10 judges the device type from four bits from bit 7 to bit 4 of the device ID in the CISTPL_DEVICE tuple. FIG. 10 is a correspondence table between values of four bits from bit 7 to bit 4 of the device ID and device types. In this embodiment, when the device type is DTYPE_IO, the information processing device 10 judges that the CF card 50 supports the TrueIDE mode, and in the other cases, judges that the TrueIDE mode is not supported. In other words, if the value of four bits from bit 7 to bit 4 indicating the device type is 13 (hexadecimal D), it judges that the TrueIDE mode is supported.

Then, the information processing device 10 acquires the value of a card function code in a CISTPL_FUNCID tuple and judges whether the card function is a fixed disk. FIG. 11 is a correspondence table between values of the card function code and card functions. As can be seen from FIG. 11, in this embodiment, if the value of the card function code is 4, the card function is the fixed disk, and the information processing device 10 judges that the TrueIDE mode is supported.

When judging that the inserted CF card 50 does not support the TrueIDE mode as a result of the judgment based on these device ID of CISTPL_DEVICE and CISTPL_FUNCID (step S32: NO), that is, when the CF card 50 is the I/O card, the information processing device 10 gives notice of an error to the user (step S34), and ends this processing. The notice of the error can be realized, for example, by displaying an error message that the inserted CF card 50 does not support the TrueIDE mode on the display screen 34 or by making a sound.

On the other hand, when judging that the inserted CF card 50 supports the TrueIDE mode (step S32: YES), that is, when the CF card 50 is the memory card, the information processing device 10 asserts the RESET signal of the CF card 50 (step S36). Subsequently, the information processing device 10 switches the card-side interface of the card controller 60 from the outputtable state to the high-impedance state (step S38).

Then, the information processing device 10 drives the card power control signal low to temporarily turn off the card power (step S40). By driving the card power control signal low, the card power discharge circuit 64 operates, and the power line of the card power is connected to the ground and forcibly discharged. This step S40 corresponds to the time T2 in FIG. 4.

Then, the information processing device 10 waits until a predetermined time passes (step S42). As described using FIG. 4, in this embodiment, this waiting time can be made extremely short.

After this waiting time, the information processing device 10 initializes the card controller 60 (step S44), and thereafter drives the card power control signal high while fixing an OE signal of the CF card 50 to the ground (step S46). Thus, the card power is supplied again to the CF card 50, and the CF card 50 gets up and running in the TrueIDE mode. Since the card power control signal goes high, the operation of the card power discharge circuit 64 is stopped, and the power line of the card power is disconnected from the ground. This step S46 corresponds to a time T3 in FIG. 4.

Then, the information processing device 10 switches the card controller 60 from the high-impedance state to the outputtable state (step S48). Subsequently, the information processing device 10 negates the RESET signal (step S50).

Then, the information processing device 10 checks the communication speed supportable by the CF card 50 in the TrueIDE mode (step S52). Namely, even in the TrueIDE mode, the supportable communication speed differs according to the type of the CF card 50, so that it is necessary to check the supportable communication speed.

Generally, the TrueIDE mode includes three main types of transfer modes: PIO mode, Multiword DMA mode, and Ultra DMA mode. These three transfer modes have several modes according to supported speeds, respectively. In the information processing device 10 according to this embodiment, it is assumed that out of these three transfer modes, only the PIO mode is supported.

It is further assumed that the information processing device 10 according to this embodiment supports Revision 3.0 (CF+ and Compact Flash Specification Revision 3.0) as the latest revision of the PIO mode. Since in the Revision 3.0 PIO mode, PIO mode 0 to PIO mode 6 are defined, it is judged which of the PIO modes is supported by the inserted CF card 50. More specifically, the PIO mode supported by the CF card 50 is specified by an IdentifyDevice command. In the PIO mode, the communication speed is the slowest in the PIO mode 0, and becomes faster as the mode shifts toward the PIO mode 6. Accordingly, the information processing device 10 selects a mode with the fastest communication speed out of the PIO modes supported by the CF card 50.

Then, the information processing device 10 starts access to the CF card 50 in the mode with the communication speed selected in step S52 (step S54). This leads to a state where the CF card 50 can be accessed which is needed by the CPU 20. By the end of this access, this card access processing is ended. The state where the CF card 50 can be accessed may be maintained, for example, until the CF card 50 is pulled out of the card slot 40 or until a predetermined time passes after the CF card 50 is no longer accessed.

As described above, according to the information processing device 10 of this embodiment, when the card power discharge circuit 64 is provided and the card power is on, the power line of the card power is disconnected from the ground, but when the card power is off, the power line of the card power is connected to the ground. Therefore, when the card power is switched from on to off, the card power can fall in a short period of time, which can reduce the user's waiting time.

This operation of switching the card power from on to off is directly connected with waiting time of access to the CF card 50 since it is necessary that after the CF card 50 is accessed in the memory mode to acquire the card attribute information when the CF card 50 is first accessed, the card power is temporarily turned off when the CF card 50 is switched to the TrueIDE mode, and according to this embodiment, this access waiting time can be reduced.

Further, also when the user pulls the CF card 50 out of the card slot 40, the card power supplied to the CF card 50 needs to be automatically turned off, but according to this embodiment, the card power can fall in a shorter time than in the related art, so that even if the user pulls out the CF card 50 quickly, the CF card 50 can be prevented from being damaged.

Furthermore, according to this embodiment, while the card power is being supplied to the CF card 50, the power line of the card power is disconnected from the ground, which can reduce wasteful consumption of the card power. Namely, a method of simply always connecting the power line of the card power via a resistor is conceivable, but in this case, a current constantly flows to the ground via the resistor while the card power is on, thereby causing wasteful power consumption. In contrast, in this embodiment, while the card power is on, the power line of the card power is disconnected from the ground, so that the above wasteful power consumption can be avoided. In particular, the reduction in wasteful power consumption is important in information processing devices including a digital camera, a portable information terminal, and so on which require the longest possible continuous operation time by a battery.

Second Embodiment

A second embodiment is designed to reduce a time from when the need for reading/writing data from/to the card-type medium arises until the data can be actually read from and written to the card medium by making a modification to the above first embodiment. Portions different from those of the above first embodiment will be described below.

The hardware configuration of the information processing device 10 according to this embodiment is the same as that according to the above first embodiment. Card access preprocessing constantly performed by the information processing device 10 will be described using FIG. 12, FIG. 13, and FIG. 14. This card access preprocessing is realized by the CPU 20 reading and executing a card access preprocessing program stored in the ROM 24 or the hard disk drive 26. This card access preprocessing is automatically started when the power of the information processing device 10 is turned on.

Figure 12:
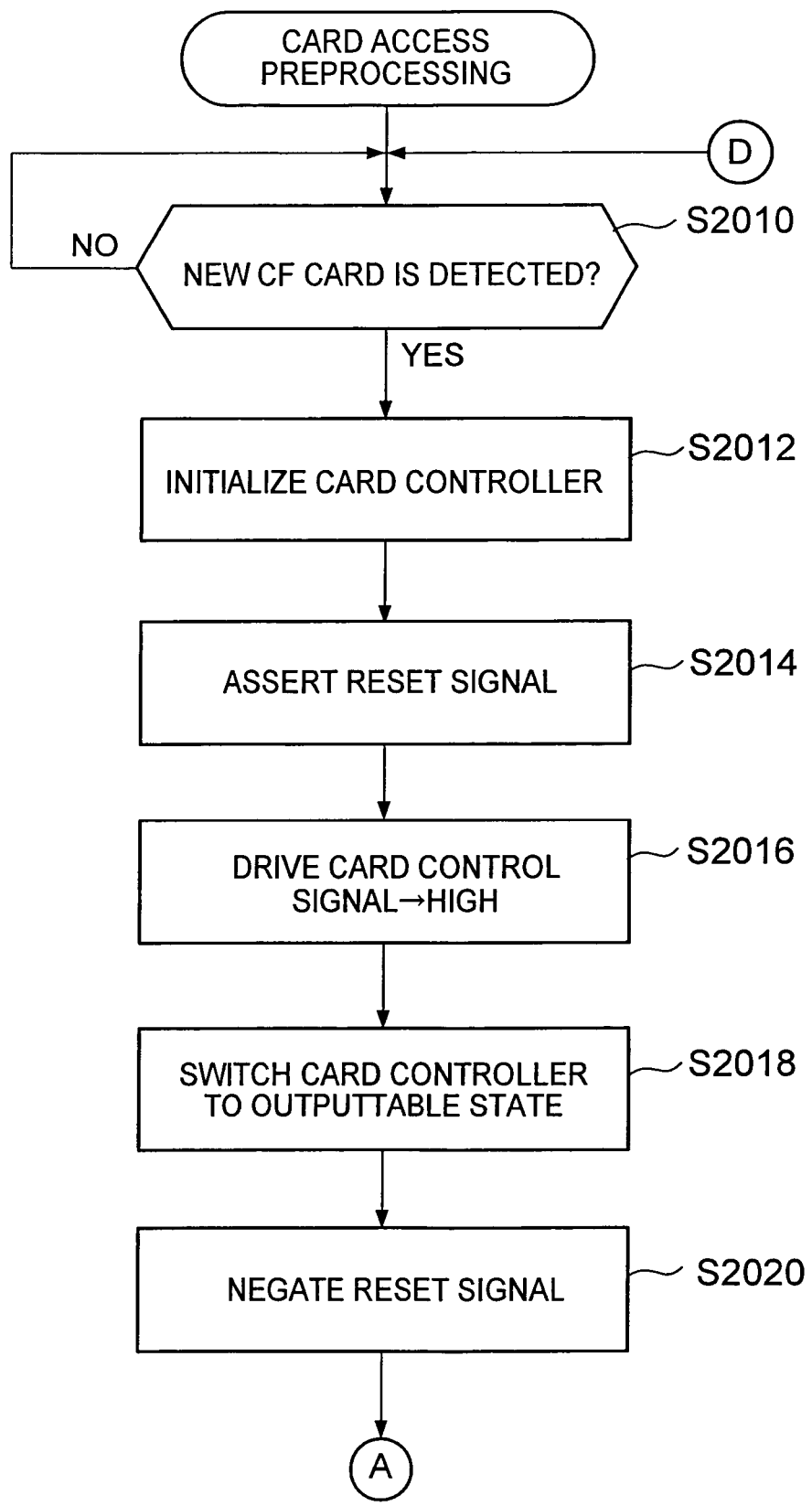
FIG. 12 is a flowchart for explaining an example of card access preprocessing according to a second embodiment performed by the information processing device shown in FIG. 1 (Part 1)

As shown in FIG. 12, the information processing device 10 judges whether the new CF card 50 is detected in the card slot 40 (step S2010). In this embodiment, based on the above card detection signal outputted from the card slot 40, it judges whether the new CF card 50 is inserted into the card slot 40. More specifically, the information processing device 10 judges that the new CF card 50 is inserted into the card slot 40 when both the CD1 signal and the CD2 signal in the card slot 40 change from high to low. Further, in this embodiment, also when the information processing device 10 checks the CD1 signal and the CD2 signal in the card slot 40 when the power of the information processing device 10 itself is turned on and these CD1 signal and CD2 signal are low when the power is turned on, the information processing device 10 judges that the new CF card 50 is inserted into the card slot 40 since the CF card 50 is already inserted into the card slot 40. Namely, in this embodiment, while the CF card 50 is inserted, these CD1 signal and CD2 signal are low, and when the CF card 50 is not inserted, these CD1 signal and CD2 signal are high.

When judging in step S2010 that the CF card 50 is not inserted (step S2010: NO), the information processing device 10 repeats step S2010 and stands by until the CF card 50 is inserted into the card slot 40.

On the other hand, when judging in step S2010 that the CF card 50 is newly inserted into the card slot 40 (step S2010: YES), the information processing device 10 initializes the card controller (step S2012).

Then, the information processing device 10 asserts the RESET signal of the CF card 50 (step S2014). Subsequently, the information processing device 10 switches the card power control signal from low to high to get the card power up and running (step S2016). At this time, it gets the CF card 50 up and running in the memory mode.

Figure 15:
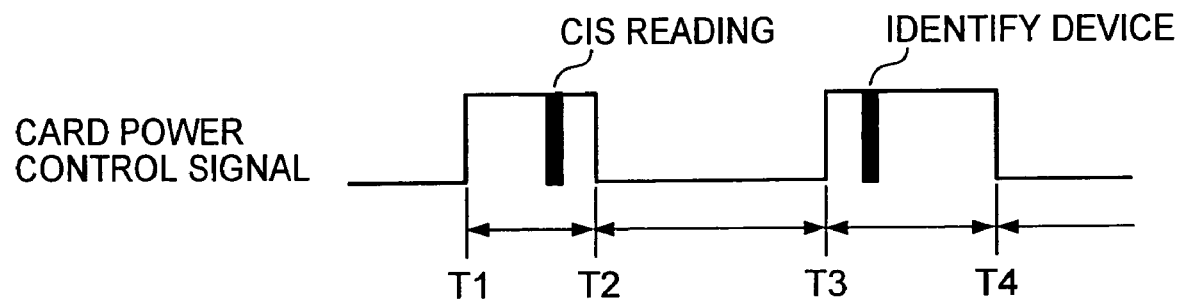
FIG. 15 is a diagram showing an operation waveform of the card power control signal, a read timing of the CIS information, and an execution timing of an IdentifyDevice command when the IdentifyDevice command is executed in a TrueIDE mode.

FIG. 15 is a diagram showing an example of an operation waveform of the card power control signal, a read timing of the CIS information, and an execution timing of the IdentifyDevice command according to this embodiment. This step S2016 corresponds to a time T1 in FIG. 15.

Then, after waiting until the card power becomes stable, the information processing device 10 switches the card-side interface of the card controller 60 from the high-impedance state to the outputtable state (step S2018). Subsequently, the information processing device 10 negates the RESET signal (step S2020).

Figure 13:
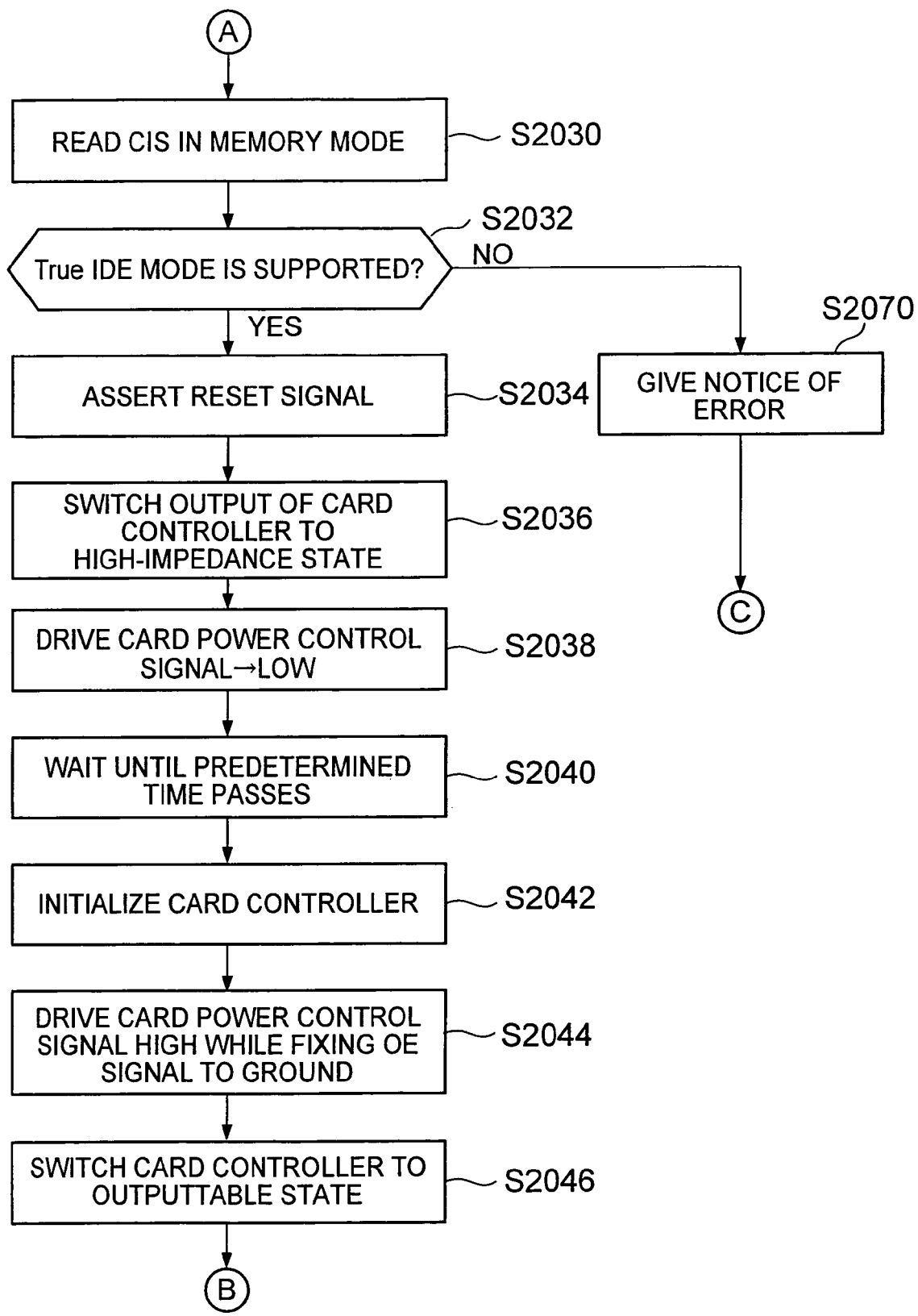
FIG. 13 is a flowchart for explaining the example of the card access preprocessing according to the second embodiment performed by the information processing device shown in FIG. 1 (Part 2)

Then, as shown in FIG. 13, the information processing device 10 reads the CIS information as the card attribute information in the memory mode (step S2030).

Subsequently, based on the read CIS information, the information processing device 10 judges whether the inserted CF card 50 supports the TrueIDE mode (step S2032). More specifically, the information processing device 10 analyzes the device ID of CISTPL_DEVICE of the CIS information and CISTPL_FUNCID and judges whether the TrueIDE mode is supported. The judgment method at this time is the same as that in the above first embodiment.

When judging that the inserted CF card 50 supports the TrueIDE mode as a result of the judgment (step S2032: YES), that is, when the CF card 50 is the memory card, the information processing device 10 asserts the RESET signal of the CF card 50 (step S2034). Subsequently, the information processing device 10 switches the card-side interface of the card controller 60 from the outputtable state to the high-impedance state (step S2036).

Then, the information processing device 10 drives the card power control signal low to temporarily turn off the card power (step S2038). By driving the card power control signal low, the card power discharge circuit 64 operates, and the power line of the card power is connected to the ground and forcibly discharged. This step S2038 corresponds to a time T2 in FIG. 15.

Then, the information processing device 10 waits until a predetermined time passes (step S2040). As described in the first embodiment, in this information processing device 10, this waiting time can be made extremely short.

After this waiting time, the information processing device 10 initializes the card controller 60 (step S2042), and thereafter drives the card power control signal high while fixing the OE signal of the CF card 50 to the ground (step S2044). Thus, the card power is supplied again to the CF card 50, and the CF card 50 gets up and running in the TrueIDE mode. Since the card power control signal goes high, the operation of the card power discharge circuit 64 is stopped, and the power line of the card power is disconnected from the ground. This step S2044 corresponds to a time T3 in FIG. 15.

Then, the information processing device 10 switches the card controller 60 from the high-impedance state to the outputtable state (step S2046).

Figure 14:
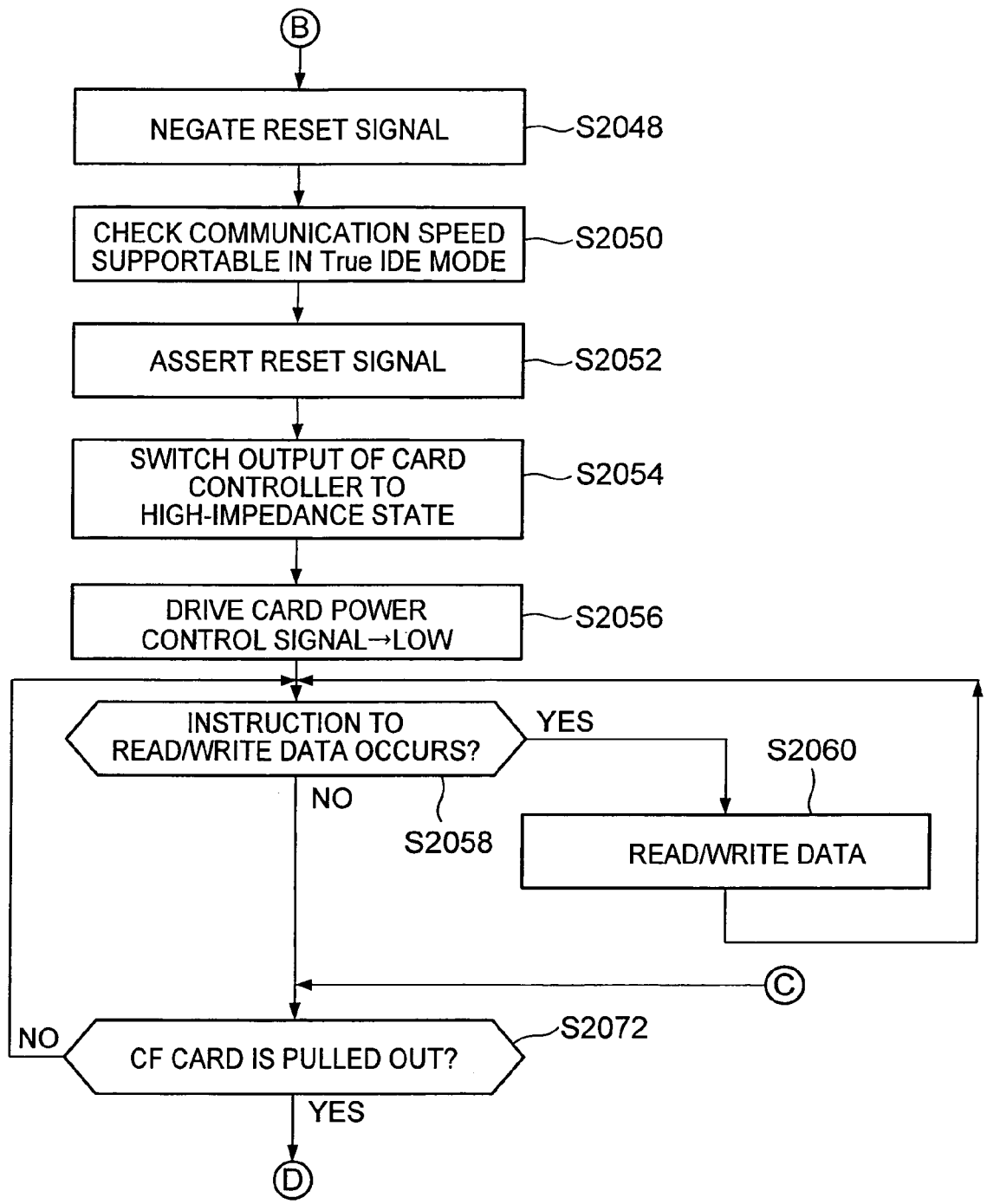
FIG. 14 is a flowchart for explaining the example of the card access preprocessing according to the second embodiment performed by the information processing device shown in FIG. 1 (Part 3)

Subsequently, as shown in FIG. 14, the information processing device 10 negates the RESET signal (step S2048).

Then, the information processing device 10 checks the communication speed supportable by the CF card 50 in the TrueIDE mode (step S2050). Namely, even in the TrueIDE mode, the supportable communication speed differs according to the type of the CF card 50, so that it is necessary to check the supportable communication speed.

Generally, the TrueIDE mode includes three main types of transfer modes: PIO mode, Multiword DMA mode, and Ultra DMA mode. These three transfer modes have several modes according to supported speeds, respectively. In the information processing device 10 according to this embodiment, it is assumed that out of these three transfer modes, only the PIO mode is supported.

It is further assumed that the information processing device 10 according to this embodiment supports Revision 3.0 (CF+ and Compact Flash Specification Revision 3.0) as the latest revision of the PIO mode. Since in the Revision 3.0 PIO mode, PIO mode 0 to PIO mode 6 are defined, it is judged which of the PIO modes is supported by the inserted CF card 50. More specifically, the PIO mode supported by the CF card 50 is specified by the IdentifyDevice command. In the PIO mode, the communication speed is the slowest in the PIO mode 0, and becomes faster as the mode shifts toward the PIO mode 6. Accordingly, the information processing device 10 selects a mode with the fastest communication speed out of the PIO modes supported by the CF card 50.

Then, the information processing device 10 asserts the RESET signal of the CF card 50 (step S2052). Subsequently, the information processing device 10 switches the card-side interface of the card controller 60 from the outputtable state to the high-impedance state (step S2054).

Then, the information processing device 10 changes the card power control signal from high to low to turn off the card power (step S2056). In this embodiment, it is unknown when a request to read/write data from/to the CF card 50 actually occurs, so that in order to reduce power consumption, the supply of the card power to the CF card 50 is temporarily stopped. The information processing device 10 waits until the operation of reading/writing data from/to the CF card actually occurs while standing by in a state where the supply of the card power is stopped.

Note, however, that the timing of stopping the supply of the card power is optional, and the supply of the card power may be stopped immediately after the completion of step S2050 or may be stopped after a predetermined time (10 seconds, for example) after the completion of step S2050. In particular, when the CF card 50 is newly inserted into the card slot 40, it is only required to stop the supply of the card power after the predetermined time after the completion of step S2050 if it is conceivable that the user reads/writes data from/to the CF card 50 in a short time after that. Further, if it is conceivable that the electric power consumed by the supply of the card power is not very large, these steps S2052 to step S2056 can be omitted. In this case, after the time T3 in FIG. 15, the card power continues to be supplied.

Then, the information processing device 10 judges whether an instruction to read/write data from/to the CF card 50 actually occurs (step S2058). If the instruction to read/write data from/to the CF card 50 actually occurs (step S2058: YES), the information processing device 10 immediately reads/writes data from/to the CF card 50 in the TrueIDE mode at the communication speed determined in step S2050 (step S2060). Incidentally, when the supply of the card power is temporarily stopped, it is necessary to start again the supply of the card power at a point in time when the operation of reading/writing data from/to the CF card 50 has occurred. After this operation of reading/writing data is completed, the information processing device 10 returns to step S2058.

In contrast, when judging in step S2032 in FIG. 13 described above that the inserted CF card 50 does not support the TrueIDE mode (step S2032: NO), that is, when the CF card 50 is the I/O card, the information processing device 10 gives notice of an error to the user (step S2070). The notice of the error can be realized, for example, by displaying an error message that the inserted CF card 50 does not support the TrueIDE mode on the display screen 34 or by making a sound.

After the processing in step S2070, or when judging in step S2058 in step S2058 that the instruction to read/write data does not occur (step S2058: NO), as shown in FIG. 14, the information processing device 10 judges whether the CF card 50 is pulled out of the card slot 40 (step S2072). More specifically, the information processing device 10 judges whether the CF card 50 is pulled out by judging whether either or both of the CD1 signal and CD2 signal in the card slot 40 change from low to high. Namely, in this embodiment, in the judgment in step S2010 as to whether the CF card 50 is inserted into the card slot 40, the information processing device 10 judges that the CF card 50 is inserted when both of the CD1 signal and the CD2 signal change to low, and in the judgment in step S2072 as to whether the CF card 50 is pulled out of the card slot 40, it judges that the CF card 50 is pulled out when either of the CD1 signal and the CD2 signal changes to high. When the CF card 50 is not pulled out (step S2072: NO), the information processing device 10 stands by while repeating the processing in step S2072.

On the other hand, when judging that the CF card 50 is pulled out (step S2072: YES), the information processing device 10 returns to step S2010 in FIG. 12 described above, and stands by until the next new CF card 50 is detected.

As described above, according to the information processing device 10 of this embodiment, the preprocessing needed to read/write data from/to the CF card 50 is performed when the new CF card 50 is detected, so that this preprocessing can be omitted when the information processing device 10 actually performs the processing of reading/writing data from/to the CF card 50. Namely, it is possible to immediately write data to the CF card 50 and read data from the CF card 50 in the TrueIDE mode at the communication speed checked in step S2050. This can quickly realize the reading/writing of data from/to the CF card 50 and reduce the user's waiting time.

In particular, if the user's waiting time becomes longer when the user accesses the CF card 50 in order to reproduce still image data, moving image data, music data, or the like stored in the CF card 50, the user's ease of operation is very adversely affected. For example, if the time from when the user inputs an instruction to the information processing device 10 until the first thumbnail image is displayed on the display screen 34 when the still image data stored in the CF card 50 is read and thumbnail images are displayed on the display screen 34, the user may feel this waiting time uncomfortable. This embodiment makes it possible to reduce the time until the first thumbnail image is displayed compared with the related art and improve the user's ease of operation.

Moreover, according to the information processing device 10 of this embodiment, the card power discharge circuit 64 is provided, and when the card power is on, the power line of the card power is disconnected from the ground, whereas when the card power is off, the power line of the card power is connected to the ground. Consequently, when the card power is switched from on to off, the card power can fall in a short period of time. This makes it possible to reduce the time from the time T2 in FIG. 15 when the card power is turned off to the time T3 when the card power is turned on again.

Further, also when the user pulls the CF card 50 out of the card slot 40, the card power supplied to the CF card 50 needs to be automatically turned off, but according to this embodiment, the card power can fall in a shorter time than in the related art, so that even when the user pulls out the CF card 50 quickly, the CF card 50 can be prevented from being damaged.

Furthermore, according to this embodiment, while the card power is being supplied to the CF card 50, the power line of the card power is disconnected from the ground, which can reduce wasteful consumption of the card power. Namely, a method of simply always connecting the power line of the card power via a resistor is conceivable, but in this case, a current constantly flows to the ground via the resistor while the card power is on, thereby causing wasteful power consumption. In contrast, in this embodiment, while the card power is on, the power line of the card power is disconnected from the ground, so that the above wasteful power consumption can be avoided. In particular, the reduction in wasteful power consumption is important in information processing devices including a digital camera, a portable information terminal, and so on which require the longest possible continuous operation time by a battery.

Third Embodiment

In the above second embodiment, the communication speed supported by the CF card 50 is checked by executing the IdentifyDevice command in the TrueIDE mode, but in a third embodiment, the communication speed supported by the CF card 50 is checked by executing the IdentifyDevice command in the memory mode. Portions different from those of the above second embodiment will be described below.

Figure 16:
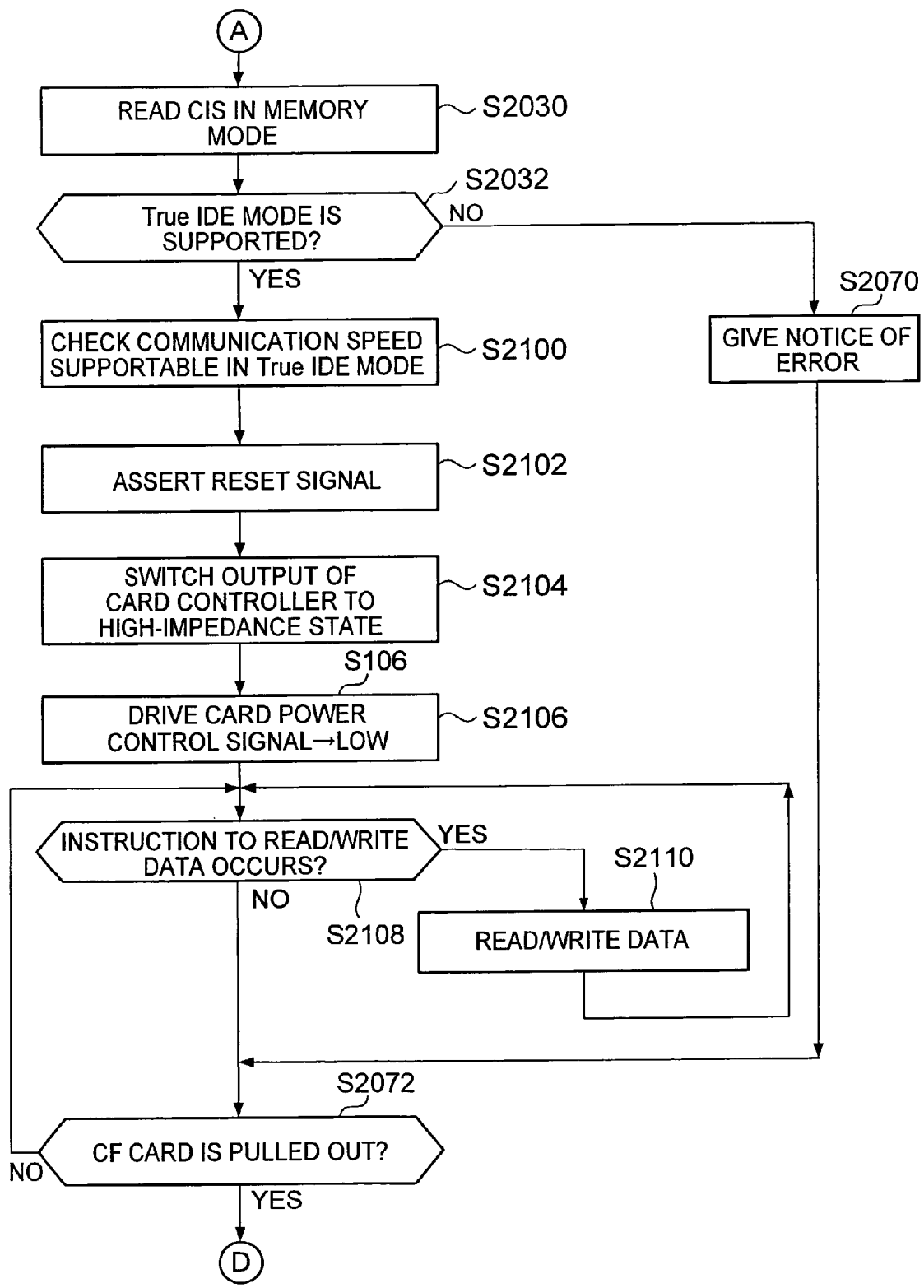
FIG. 16 is a flowchart exemplifying part of card access preprocessing according to a third embodiment performed by the information processing device shown in FIG. 1.

FIG. 16 is part of a flowchart for explaining the contents of card access preprocessing according to this embodiment, and corresponds to FIG. 13 and FIG. 14 in the above second embodiment. The processing up to step S2032 shown in FIG. 16 is the same as that in the above second embodiment.

As shown in FIG. 16, when judging in step S2032 that the CF card 50 inserted into the card slot 40 supports the TrueIDE mode (step S2032: YES), the information processing device 10 checks the communication speed supportable in the TrueIDE mode (step S2100). Namely, in this embodiment, the supportable communication speed is checked by executing the IdentfyDevice command in the memory mode and checking the transfer mode supported by the CF card 50. A specific method for checking the communication speed is the same as that in step S2050 in the above second embodiment. Also, similarly to the first embodiment, the information processing device 10 supports only the PIO mode out of three modes: PIO mode, Multiword DMA mode, and Ultra DMA mode, and similarly to the second embodiment, it supports the latest Revision 3.0 of the PIO mode.

Figure 17:
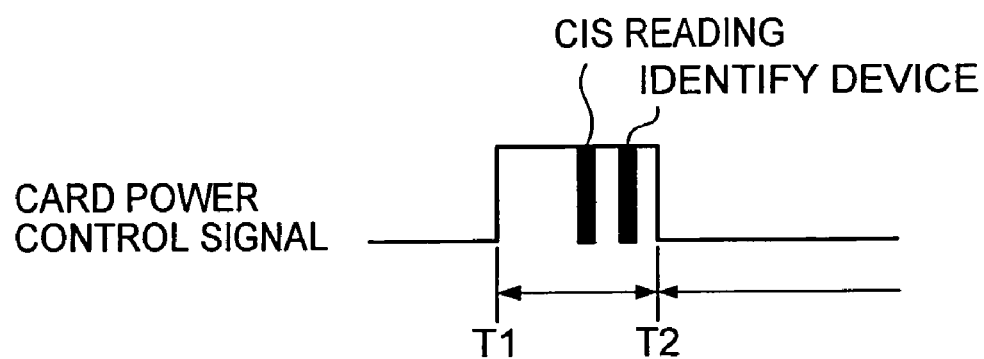
FIG. 17 is a diagram showing an operation waveform of the card power control signal, a read timing of the CIS information, and an execution timing of the IdentifyDevice command when the IdentifyDevice command is executed in a memory mode.

FIG. 17 is a diagram showing an example of an operation waveform of the card power control signal, a read timing of the CIS information, and an execution timing of the IdentifyDevice command according to this embodiment. As shown in FIG. 17, in this embodiment, the IdentifyDevice command is executed in the memory mode between a time T1 and a time T2.

Then, the information processing device 10 asserts the RESET signal of the CF card 50 (step S2102). Subsequently, the information processing device 10 switches the card-side interface of the card controller 60 from the outputtable state to the high-impedance state (step S2104).

Then, the information processing device 10 switches the card power control signal from high to low to turn off the card power (step S2106). Namely, wasteful power consumption is reduced by stopping the supply of the card power to the CF card 50 until data read/write access to the CF card 50 actually occurs. Note, however, that the timing of stopping the supply of the card power is optional, and the supply of the card power may be stopped immediately after the completion of step S2100 or may be stopped after a predetermined time (10 seconds, for example) after the completion of step S2100.

Then, the information processing device 10 judges whether an instruction to read/write data from/to the CF card 50 actually occurs (step S2108). If the instruction to read/write data from/to the CF card 50 actually occurs (step S2108: YES), the information processing device 10 immediately reads/writes data from/to the CF card 50 in the TrueIDE mode at the communication speed determined in step S2100 (step S2110). Incidentally, when the supply of the card power is temporarily stopped, it is necessary to start again the supply of the card power at a point in time when the operation of reading/writing data from/to the CF card 50 has occurred. After this operation of reading/writing data is completed, the information processing device 10 returns to step S2108.

In contrast, when judging in the above step S2108 that the instruction to read/write data does not occur (step S2108: NO), or after performing step S2070, the information processing device 10 judges whether the CF card 50 is pulled out of the card slot 40 (step S2072) as in the above second embodiment, and when judging that the CF card 50 is pulled out (step S2072: YES), the information processing device 10 returns to step S2010 in FIG. 12 described above, and stands by until the next CF card 50 is inserted. On the other hand, when the CF card 50 is not pulled out of the card slot 40 (step S2072: NO), the information processing device 10 repeats the processing from step S2108.

As described above, also according to the information processing device 10 of this embodiment, the preprocessing needed to read/write data from/to the CF card 50 is performed when the new CF card 50 is detected, so that this preprocessing can be omitted when the information processing device 10 actually reads/writes data from/to the CF card 50. Namely, it is possible to immediately access the CF card 50 in the TrueIDE mode at the communication speed checked in step S2100. This can quickly realize the reading/writing of data from/to the CF card 50 and reduce the user's waiting time.

Further, the communication speed supported by the CF card 50 in the TrueIDE mode is checked by executing the IdentifyDevice command in the memory mode, which eliminates the need for switching the CF card 50 from the memory mode to TrueIDE mode. As a result, in the preprocessing, the processing of starting the supply of the card power again after the supply of the card power is temporarily stopped becomes unnecessary, so that the preprocessing needed for card access can be performed in a short period of time.

Fourth Embodiment

In a fourth embodiment, a modification is made to the information processing device 10 of the above first embodiment to third embodiment so that a communication speed supported in the memory mode and a communication speed supported in the TrueIDE mode are checked to exchange data in the operation mode with a faster communication speed. Portions different from those of the above first embodiment to third embodiment will be described below.

The hardware configuration of the information processing device 10 according to this embodiment is the same as that according to the above first embodiment to third embodiment. Card access preprocessing constantly performed by the information processing device 10 will be described using FIG. 18 to FIG. 20. This card access preprocessing is realized by the CPU 20 reading and executing a card access preprocessing program stored in the ROM 24 or the hard disk drive 26. This card access preprocessing is automatically started when the power of the information processing device 10 is turned on.

Figure 18:
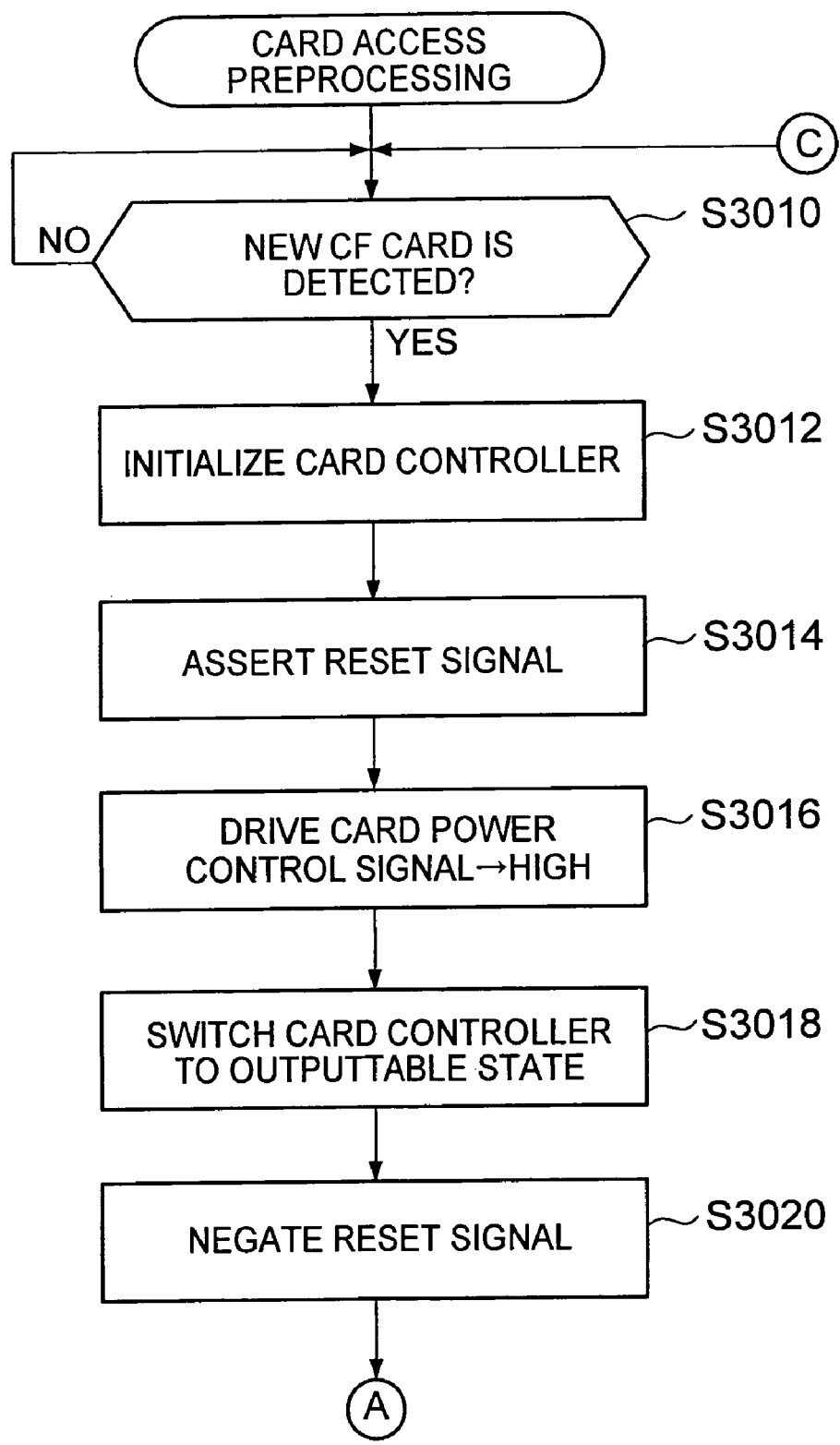
FIG. 18 is a flowchart for explaining an example of card access preprocessing according to a fourth embodiment performed by the information processing device shown in FIG. 1 (Part 1)

As shown in FIG. 18, the information processing device 10 judges whether the new CF card 50 is detected in the card slot 40 (step S3010). In this embodiment, based on the above card detection signal outputted from the card slot 40, it judges whether the new CF card 50 is inserted into the card slot 40. More specifically, the information processing device 10 judges that the new CF card 50 is inserted into the card slot 40 when both the CD1 signal and the CD2 signal in the card clot 40 change from high to low. Further, in this embodiment, also when the information processing device 10 checks the CD1 signal and the CD2 signal in the card slot 40 when the power of the information processing device 10 itself is turned on and these CD1 signal and CD2 signal are low when the power is turned on, the information processing device 10 judges that the new CF card 50 is inserted into the card slot 40 since the CF card 50 is already inserted into the card slot 40. Namely, in this embodiment, while the CF card 50 is inserted, these CD1 signal and CD2 signal are low, and when the CF card 50 is not inserted, these CD1 signal and CD2 signal are high.

When judging in step S3010 that the new CF card 50 is not detected (step S3010: NO), the information processing device 10 repeats step S3010 and stands by until the new CF card 50 is detected in the card slot 40.

On the other hand, when judging in step S3010 that the new CF card 50 is detected in the card slot 40 (step S3010: YES), the information processing device 10 initializes the card controller 60 (step S3012).

Then, the information processing device 10 asserts the RESET signal of the CF card 50 (step S3014). Subsequently, the information processing device 10 switches the card power control signal from low to high to get the card power up and running (step S3016). At this time, it gets the CF card 50 up and running in the memory mode.

Then, after waiting until the card power becomes stable, the information processing device 10 switches the card-side interface of the card controller 60 from the high-impedance state to the outputtable state (step S3018). Subsequently, the information processing device 10 negates the RESET signal (step S3020).

Figure 19:
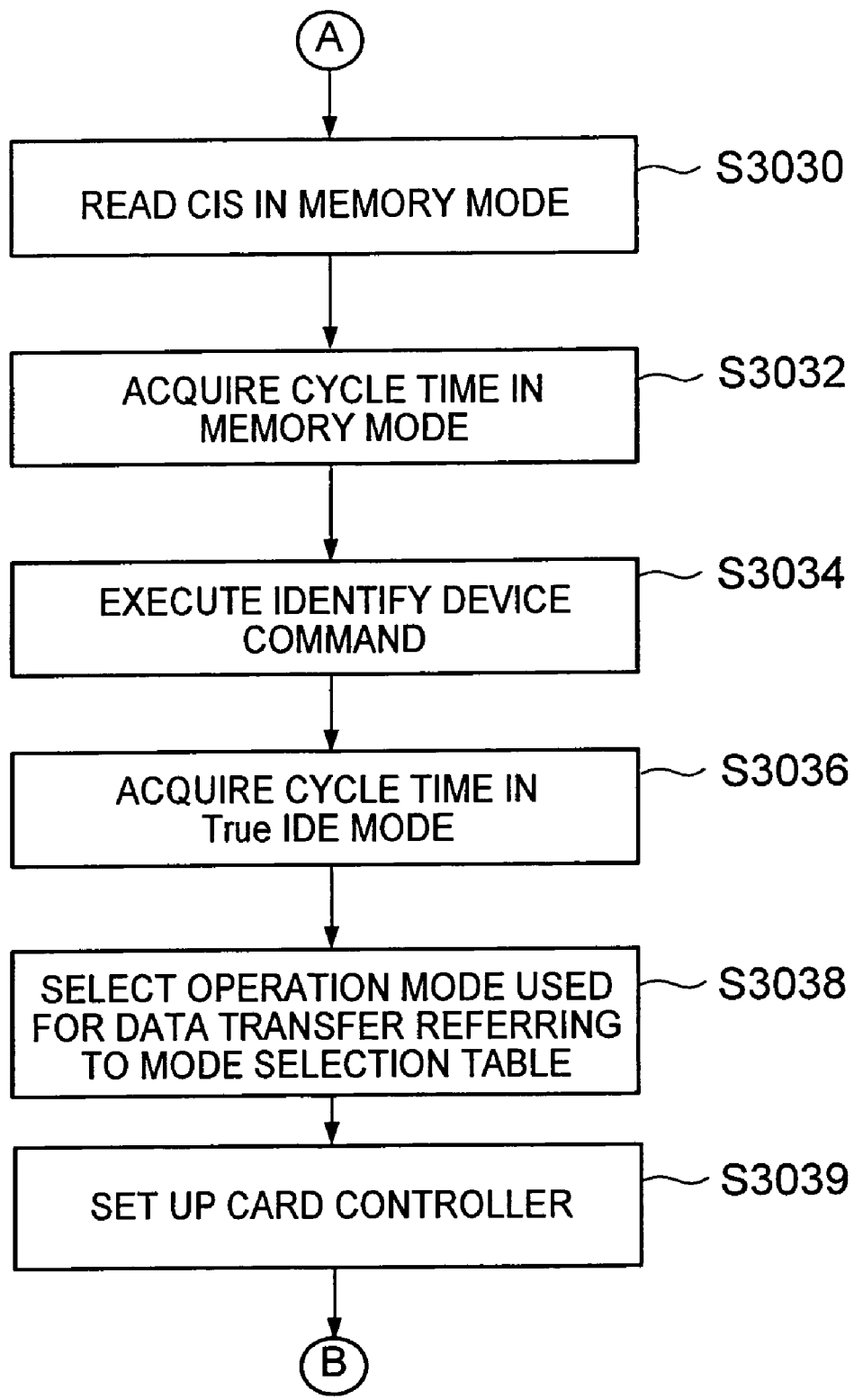
FIG. 19 is a flowchart for explaining the example of the card access preprocessing according to the fourth embodiment performed by the information processing device shown in FIG. 1 (Part 2)

Then, as shown in FIG. 19, the information processing device 10 reads the CIS information as the card attribute information in the memory mode (step S3030).

Subsequently, based on the read CIS information, the information processing device 10 checks and acquires a cycle time in the memory mode of the inserted CF card 50 (step S3032).

FIG. 21 is a list of cycle times with a possibility of being supported by the CF card 50 in the memory mode. As shown in FIG. 21, in this embodiment, the CF card 50 operates at a cycle time of 250 ns, 150 ns, 120 ns, 100 ns, or 80 ns. Which of cycle times is supported by the CF card can be judged by seeing bit 2 to bit 0 of the device ID in byte 2 in the CIST-PL_DEVICE tuple of the CIS information. Accordingly, in step S3032, based on the read CIS information, the cycle time at which the inserted CF card 50 operates is specified, and based on this cycle time, the communication speed in the memory mode is specified. The cycle time here is the time of one cycle of a basic operation clock, which means that the shorter the cycle time, the faster the basic operation becomes.

Incidentally, a cycle time of 150 ns is not supported under the CF+ and Compact Flash Specification Revision 3.0 standard, but among normal CF cards 50 and micro drives with a built-in hard disk drive, there exists a card with a specification of operating at the cycle time of 150 ns. Therefore, the information processing device 10 according to this embodiment can also support the CF card 50 and the micro drive which operate at the cycle time of 150 ns.

Then, the information processing device 10 executes the IdentifyDevice command (step S3034) and acquires a cycle time in the TrueIDE mode (step S3036). Namely, also in the TrueIDE mode, the supportable transfer mode differs according to the type of the CF card 50, and the communication speed, that is, the cycle time differs according to the supportable transfer mode. Hence, the information processing device 10 needs to check the supportable transfer mode.

Generally, the TrueIDE mode includes three main types of transfer modes: PIO mode, Multiword DMA mode, and Ultra DMA mode. These three transfer modes have several modes according to supported speeds, respectively. In the information processing device 10 according to this embodiment, it is assumed that out of these three transfer modes, only the PIO mode is supported.

It is further assumed that the information processing device 10 according to this embodiment supports Revision 3.0 (CF+ and Compact Flash Specification Revision 3.0) as the latest revision of the PIO mode. Since in the Revision 3.0 PIO mode, PIO mode 0 to PIO mode 6 are defined, the information processing device 10 judges which of the PIO modes is supported by the inserted CF card 50.

FIG. 22 is a list of cycle times in mode 0 to mode 6 defined in the PIO mode. As shown in FIG. 22, in the PIO mode, in PIO mode 0, the communication speed is the slowest and the cycle time is 600 ns. The communication speed becomes faster as the mode shifts toward PIO mode 6, and in PIO mode 6, the cycle time is 80 ns.

Figure 23:
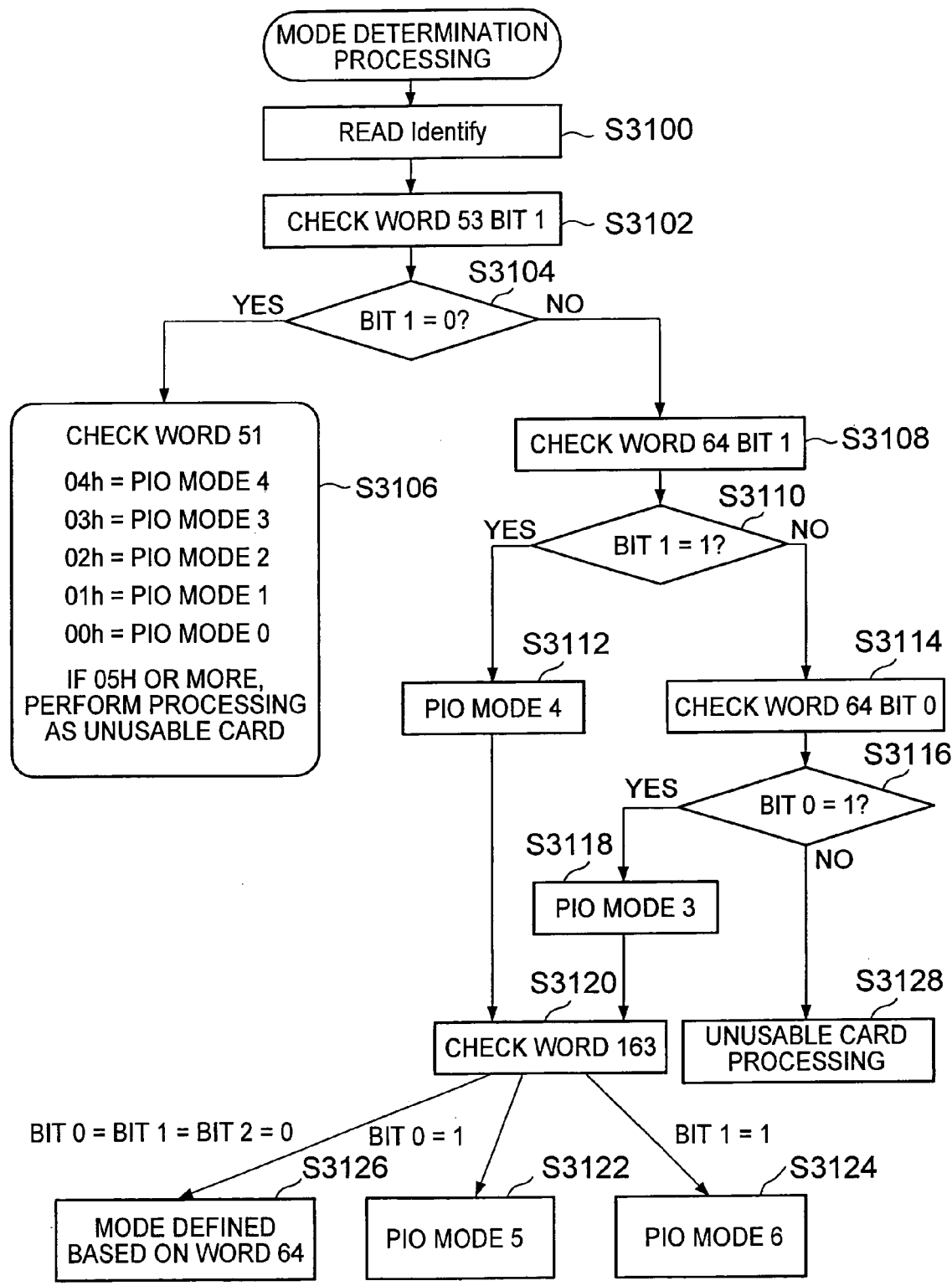
FIG. 23 is a flowchart for explaining an example of mode determination processing to determine a communication speed (PIO mode) supported by the inserted CF card in the PIO mode of the TrueIDE mode.

FIG. 23 is a flowchart for explaining the contents of mode determination processing to determine a mode supported in the PIO mode of the TrueIDE mode. This mode determination processing is realized by the CPU 20 reading and executing a mode determination program stored in the ROM 24 or the hard disk drive 26.

As shown in FIG. 23, first, the information processing device 10 executes the IdentifyDevice command to read Identify information (step S3100). Then, the information processing device 10 judges whether bit 1 of Word 53 of this Identify information is "0" (step S3102, step S3104), and, if bit 1 is "0" (step S3104: YES), determines the mode based on the value of Word 51 (step S3106). Namely, the information processing device 10 judges that PIO mode 0 is supported if the value of Word 51 is "0", PIO mode 1 is supported if "1", PIO mode 2 is supported if "2", PIO mode 3 is supported if "3", and that PIO mode 4 is supported if "4". It judges that the CF card 50 is an unusable card if the value of Word 51 is "5" or more.

On the other hand, if bit 1 of Word 53 is not "0" (step S3104: NO), the information processing device 10 checks bit 1 of Word 64 (step S3108). It judges that PIO mode 4 is supported (step S3112) if bit 1 is "1" (step S3110: YES), and that PIO mode 3 is supported (step S3118) if bit 1 is not "1" (step S3110: NO) and bit 0 of Word 64 is "1" (step S3114, step S3116). However, in the case of these step S3112 and step S3118, the information processing device 10 checks Word 163 (step s3120), and judges that PIO mode 5 is supported if bit 0 of word 163 is "1" (step S3122), and that PIO mode 6 is supported if bit 1 of Word 163 is "1" (step S3124). On the other hand, if bit 0 to bit 2 of Word 163 are 0, PIO mode 3 or PIO mode 4 defined based on Word 64 become supported modes (step S3126).

If bit 1 of Word 64 is not "1" (step S3110: NO) and bit 0 of Word 64 is not "1" either, (step S3116: NO), the information processing device 10 judges that the CF card 50 is an unusable card (step S3128). As just described, in this embodiment, by the mode determination processing shown in FIG. 23, the supported transfer mode in the PIO mode of the TrueIDE mode is judged, and the communication speed in the TrueIDE mode is acquired.

Incidentally, this IdentifyDevice command may be executed in the memory mode or may be executed in the TrueIDE mode. If the IdentifyDevice command is executed in the memory mode, it is only required to execute the IdentifyDevice command after step s3030. On the other hand, if the IdentifyDevice command is executed in the TrueIDE mode, as shown in FIG. 15, it is necessary to, after the supply of the card power to the CF card 50 is temporarily stopped and the card power falls sufficiently, get the CF card 50 up and running again in the TrueIDE mode by fixing the OE signal to the ground level and starting again the supply of the card power and thereafter execute the IdentifyDevice command.

Figure 24:
FIG. 24 is a diagram showing an example of a mode selection table to judge which of a communication speed in the memory mode and a communication speed in the TrueIDE mode is faster.

Next, as shown in FIG. 19, the information processing device 10 selects a mode used for data transfer referring to a mode selection table TB3010 (step S3038). FIG. 24 is a diagram showing an example of the constitution of the mode selection table TB3010 according to this embodiment. In this embodiment, the mode selection table TB3010 is previously stored in the ROM 24 or the hard disk drive 26.

As can be seen from FIG. 24, the mode selection table TB3010 is a list showing which of the communication speeds in the memory mode and the TrueIDE mode is faster by comparing the cycle time supported in the memory mode and the PIO mode supported in the True IDE mode. Accordingly, the information processing device 10 selects an operation mode with a faster transfer rate out of operation modes supported by the newly detected CF card 50. For example, when a cycle time of 250 ns is supported in the memory mode and PIO mode 1 of 383 ns is supported in the TrueIDE mode, the information processing device 10 selects the memory mode as the operation mode. When the cycle time of 250 ns is supported in the memory mode and PIO mode 3 of 180 ns is supported in the TrueIDE mode, it selects the TrueIDE mode as the operation mode.

However, the memory mode and the TrueIDE mode are different operation modes, so that when transfer rates are compared between these two modes, the operation mode with a shorter cycle time does not necessarily have a faster transfer rate. Therefore, in this embodiment, the operation mode is not determined simply based on the cycle time, and instead transfer rates in the memory mode and the TrueIDE mode are previously checked and the mode selection table TB3010 is prepared for selecting the operation mode with the faster transfer rate.

Then, as shown in FIG. 19, the information processing device 10 sets up the card controller 60 (step S3039). Namely, it performs the setting to adapt the card controller 60 to the operation mode selected in step S3038.

Figure 20:
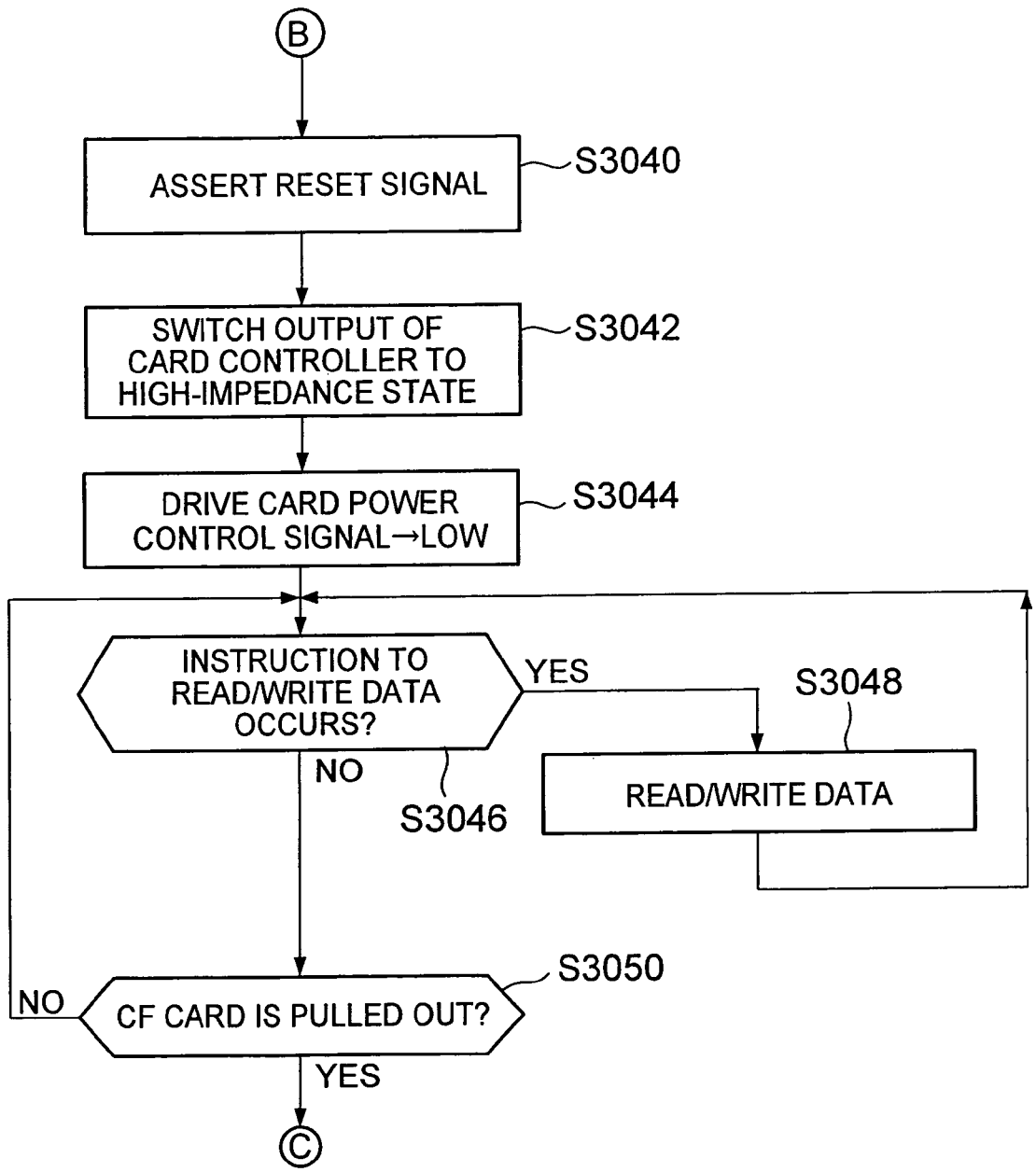
FIG. 20 is a flowchart for explaining the example of the card access preprocessing according to the fourth embodiment performed by the information processing device shown in FIG. 1 (Part 3)

Then, as shown in FIG. 20, the information processing device 10 asserts the RESET signal of the CF card 50 (step S3040). Subsequently, the information processing device 10 switches the card-side interface of the card controller 60 from the outputtable state to the high-impedance state (step S3042).

Then, the information processing device 10 changes the card power control signal from high to low to turn off the card power (step S3044). In this embodiment, it is unknown when a request to read/write data from/to the CF card 50 actually occurs, so that in order to reduce power consumption, the supply of the card power to the CF card 50 is temporarily stopped. The information processing device 10 waits until the operation of reading/writing data from/to the CF card 50 actually occurs while standing by in a state where the supply of the card power is stopped.

Note, however, that the timing of stopping the supply of the card power is optional, and the supply of the card power may be stopped immediately after the completion of step S3038 or may be stopped after a predetermined time (10 seconds, for example) after the completion of step S3038. In particular, when the CF card 50 is newly inserted into the card slot 40, it is only required to stop the supply of the card power after the predetermined time after the completion of step S3038 if it is conceivable that the user reads/writes data from/to the CF card 50 in a short time after that. Further, if it is conceivable that the electric power consumed by the supply of the card power is not very large, these steps S3040 to step S3044 can be omitted. In this case, the card power continues to be supplied to the CF card 50.

Then, the information processing device 10 judges whether an instruction to read/write data from/to the CF card 50 actually occurs (step S3046). If the instruction to read/write data from/to the CF card 50 actually occurs (step S3046: YES), the information processing device 10 reads/writes data from/to the CF card 50 in the operation mode selected in step S3038

(step S3048). Incidentally, when the supply of the card power is temporarily stopped, it is necessary to start again the supply of the card power at a point in time when the operation of reading/writing data from/to the CF card 50 has occurred. After this operation of reading/writing data is completed, the information processing device 10 returns to step S3046.

On the other hand, when judging in step S3046 that the instruction to read/write data does not occur (step S3046: NO), the information processing device 10 judges whether the CF card 50 is pulled out of the card slot 40 (step S3050). More specifically, the information processing device 10 judges whether the CF card 50 is pulled out by judging whether either or both of the CD1 signal and CD2 signal in the card slot 40 change from low to high. Namely, in this embodiment, in the judgment in step S3010 as to whether the CF card 50 is inserted into the card slot 40, the information processing device 10 judges that the CF card 50 is inserted when both of the CD1 signal and the CD2 signal change to low, and in the judgment in step S3050 as to whether the CF card 50 is pulled out of the card slot 40, it judges that the CF card 50 is pulled out when either of the CD1 signal and the CD2 signal changes to high. When the CF card 50 is not pulled out (step S3050: NO), the information processing device 10 returns to step S3046 described above.

On the other hand, when judging that the CF card 50 is pulled out (step S3050: YES), the information processing device 10 returns to step S3010 described above, and stands by until the next new CF card 50 is detected.

As described above, according to the information processing device 10 of this embodiment, the communication speed supported in the memory mode and the communication speed supported in the TrueIDE mode are checked, and data is exchanged in the operation mode with the faster communication speed, so that the user's waiting time required to exchange data with the CF card 50 can be reduced as short as possible. In particular, as concerns the CF card 50 with a cycle time in which the speed is faster in the memory mode than in the TrueIDE mode, the memory mode with the faster speed can be accurately selected by using this embodiment.

Moreover, at a point in time when the CF card 50 is inserted into the card slot 50, the operation mode in which data is to be transferred is determined, so that when the request to perform data transfer from/to the CF card actually occurs, the information processing device 10 can immediately enter into data transfer processing. This can also correspondingly reduce the user's waiting time at the time of data transfer.

Further, according to the information processing device 10 of this embodiment, the card power discharge circuit 64 is provided, and when the card power is on, the power line of the card power is disconnected from the ground, whereas when the card power is off, the power line of the card power is connected to the ground. Consequently, when the card power is switched from on to off, the card power can fall in a short period of time. In particular, when the IdentifyDevice command is executed in the TrueIDE mode in step S3034, it is necessary to temporarily turn off the card power and thereafter and thereafter get the CF card 50 up and running again, but by providing the card power discharge circuit 64, the CF card 50 can be switched to the TrueIDE mode in a short period of time.

Furthermore, also when the user pulls the CF card 50 out of the card slot 40, the card power supplied to the CF card 50 needs to be automatically turned off, but according to this embodiment, the card power can fall in a shorter time than in the related art, so that even when the user pulls out the CF card 50 quickly, the CF card 50 can be prevented from being damaged.

Besides, according to this embodiment, while the card power is being supplied to the CF card 50, the power line of the card power is disconnected from the ground, which can reduce wasteful consumption of the card power. Namely, a method of simply always connecting the power line of the card power via a resistor is conceivable, but in this case, a current constantly flows to the ground via the resistor while the card power is on, thereby causing wasteful power consumption. In contrast, in this embodiment, while the card power is on, the power line of the card power is disconnected from the ground, so that the above wasteful power consumption can be avoided. In particular, the reduction in wasteful power consumption is important in information processing devices including a digital camera, a portable information terminal, and so on which require the longest possible continuous operation time by a battery.

Fifth Embodiment

Although in the above fourth embodiment, the speed at which the information processing device 10 can communicate with the CF card 50 is judged when the CF card 50 is inserted into the card slot 40, in a fifth embodiment, the speed at which it can communicate with the CF card 50 is judged when a request to actually exchange data with the CF card 50 occurs. Portions different from those of the above fourth embodiment will be described below.

Figure 25:
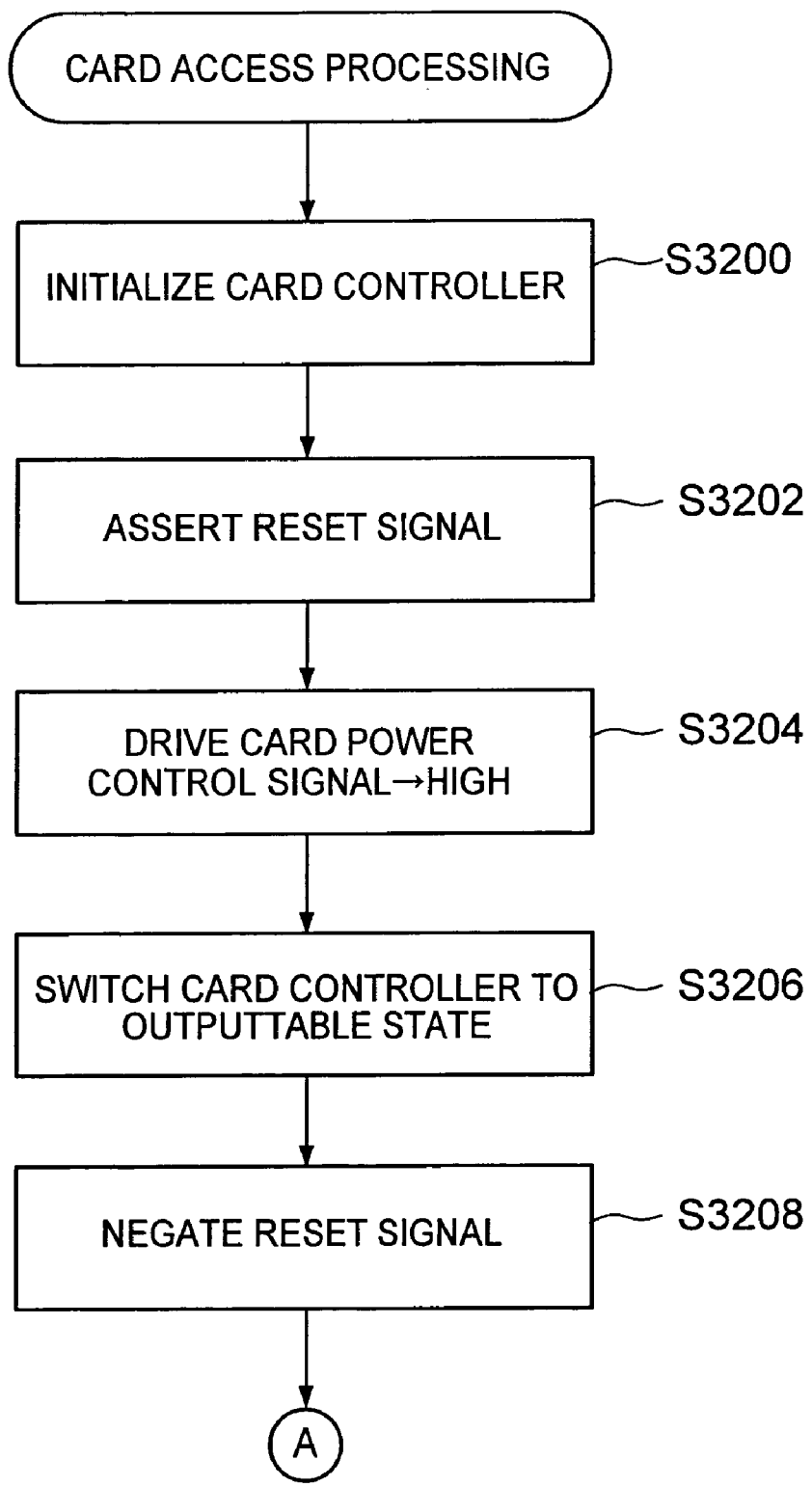
FIG. 25 is a flowchart for explaining an example of card access processing according to a fifth embodiment performed by the information processing device shown in FIG. 1 (Part 1)
Figure 26:
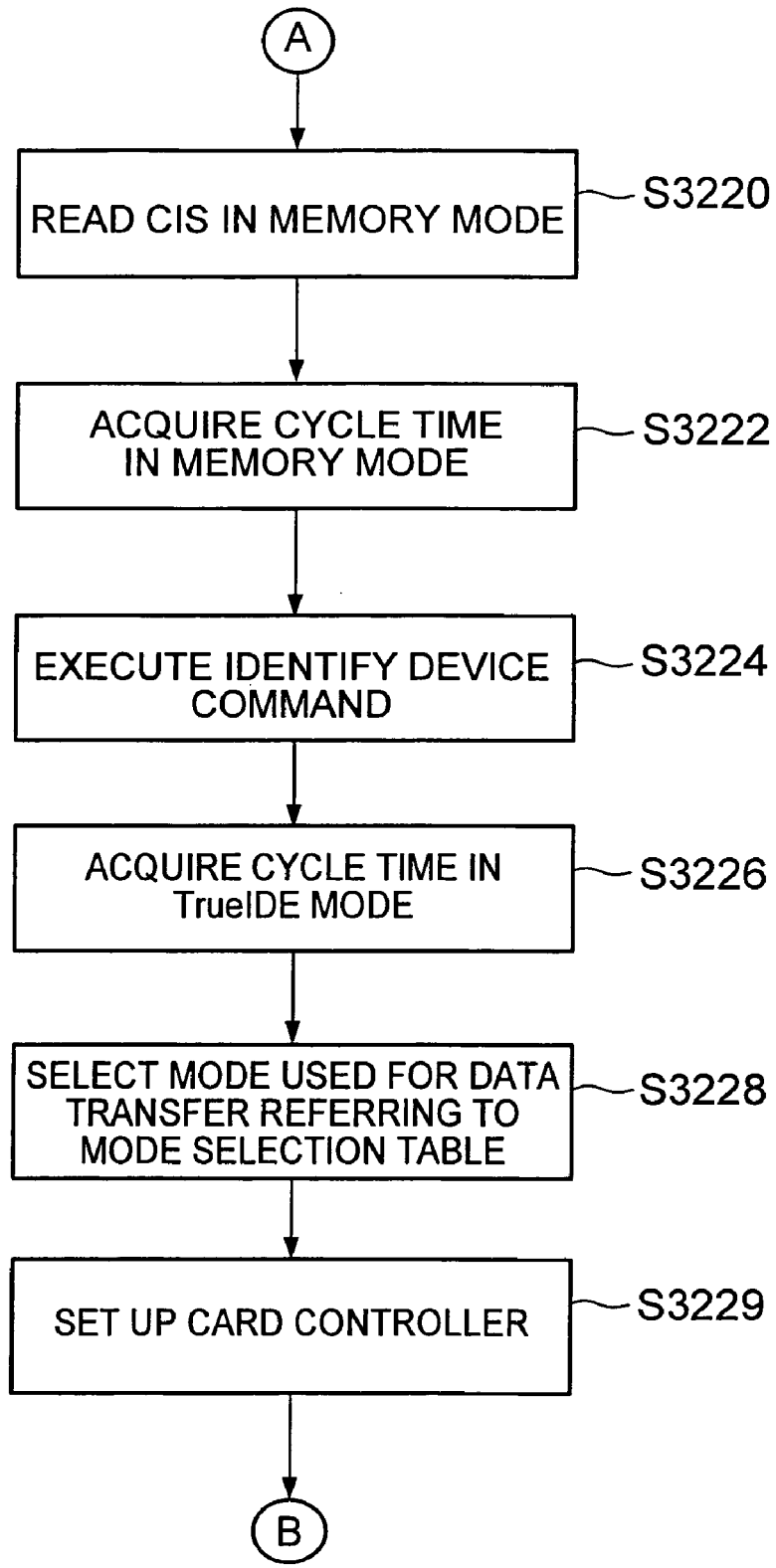
FIG. 26 is a flowchart for explaining the example of the card access processing according to the fifth embodiment performed by the information processing device shown in FIG. 1 (Part 2)
Figure 27:
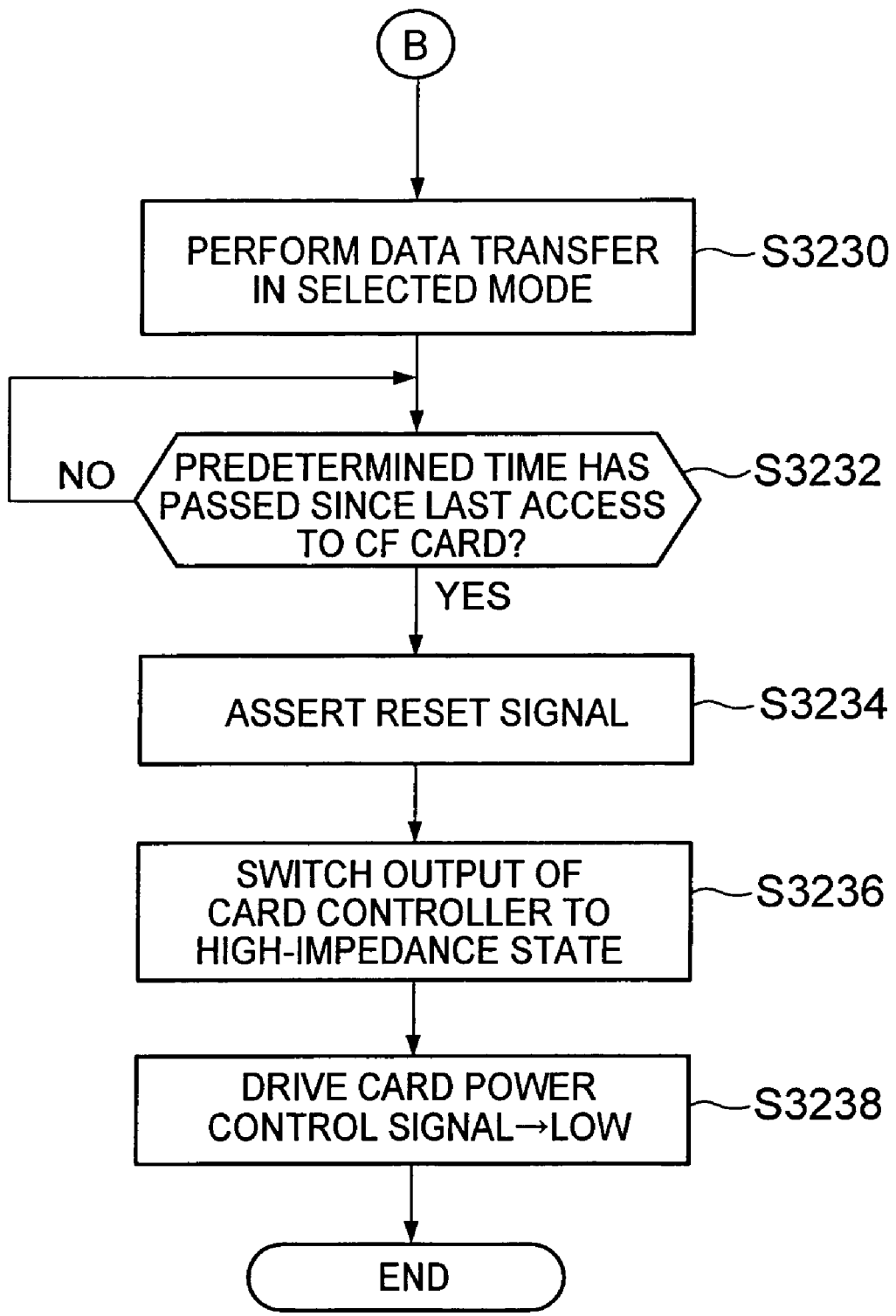
FIG. 27 is a flowchart for explaining the example of the card access processing according to the fifth embodiment performed by the information processing device shown in FIG. 1 (Part 3)

FIG. 25 to FIG. 27 are flowcharts for explaining card access processing according to the fifth embodiment. This card access processing is started when the necessity for the information processing device 10 to actually exchange data with the CF card 50 arises. Namely, this card access processing is started when the necessity for reading/writing data from/to the CF card 50 arises. This card access processing is realized by the CPU 20 reading and executing a card access program stored in the ROM 24 or the hard disk drive 26. Incidentally, in this embodiment, the card access preprocessing in the above fourth embodiment is not started when the CF card 50 is inserted into the card slot 40.

First, as shown in FIG. 25, the information processing device 10 initializes the card controller 60 (step S3200).

Then, the information processing device 10 asserts the RESET signal of the CF card 50 (step S3202). Subsequently, the information processing device 10 switches the card power control signal from low to high to get the card power up and running (step S3204). At this time, it gets the CF card 50 up and running in the memory mode.

Then, after waiting until the card power becomes stable, the information processing device 10 switches the card-side interface of the card controller 60 from the high-impedance state to the outputtable state (step S3206). Subsequently, the information processing device 10 negates the RESET signal (step S3208).

Then, as shown in FIG. 26, the information processing device 10 reads the CIS information as the card attribute information in the memory mode (step S3220).

Subsequently, based on the read CIS information, the information processing device 10 checks and acquires a cycle time in the memory mode of the inserted CF card 50 (step S3222). A specific method of judging the cycle time is the same as in step S3032 in the above fourth embodiment.

Then, the information processing device 10 executes the IdentifyDevice command (step S3224) and acquires a cycle time in the TrueIDE mode (step S3226). A specific method of judging the cycle time is the same as in step S3036 in the above fourth embodiment. Also, similarly to the above fourth embodiment, the IdentifyDevice command may be executed in either the memory mode or the TrueIDE mode.

Then, the information processing device 10 selects an operation mode used for data transfer referring to the mode selection table TB3010 in FIG. 24 (step S3228). Namely, it selects an operation mode with a faster communication speed using the mode selection table TB3010 in FIG. 24 of the above fourth embodiment.

Then, the information processing device 10 sets up the card controller 60 (step S3229). Namely, it performs the setting to adapt the card controller 60 to the operation mode selected in step S3228.

Subsequently, as shown in FIG. 27, the information processing device 10 performs actual data transfer in the mode selected in step S3228 (step S3230). Namely, if an access request to the CF card 50 is to write data to the CF card 50, the information processing device 10 writes data in the operation mode selected in step S3228, and if the access request to the CF card 50 is to read data from the CF card 50, it reads data in the operation mode selected in step S3228. The communication speed at this time is a communication speed based on the cycle time specified in step S3222 or a communication speed based on the cycle time specified in step S3226.

When the data transfer to/from the CF card 50 is completed, the information processing device 10 judges whether a predetermined time (60 seconds, for example) has passed since the last access to the CF card (step S3232). If the predetermined time has not passed (step S3232: NO), the information processing device 10 repeats step S3232. Then, when an access to the CF card 50 occurs again, the information processing device 10 performs data transfer in the operation mode selected in step S3228.

On the other hand, when the predetermined time has passed since the last access to the CF card 50 (step S3232: YES), the information processing device 10 asserts the RESET signal of the CF card 50 (step S3234). Subsequently, the information processing device 10 switches the card-side interface of the card controller 60 from the outputtable state to the high-impedance state (step S3236).

Then, the information processing device 10 changes the card power control signal from high to low to turn off the card power (step S3238). In this embodiment, it is unknown when a request to access the next CF card 50 and exchange data therewith occurs, so that in order to reduce power consumption, the supply of the card power to the CF card 50 is temporarily stopped. Thus, the card access processing according to this embodiment ends.

As described above, also according to the information processing device 10 of this embodiment, the communication speed supported in the memory mode and the communication speed supported in the TrueIDE mode are checked, and data is exchanged in the operation mode with the faster communication speed, so that the user's waiting time required to exchange data with the CF card 50 can be reduced as short as possible.

Sixth Embodiment

In the above fourth embodiment and fifth embodiment, the communication speed supported in the memory mode and the communication speed supported in the TrueIDE mode are checked, and the communication mode with the faster supported communication speed is selected to gain access.

However, it is known that in some cases, even if the CF card is accessed at a communication speed supposed to be capable of normal data exchange, a communication error occurs, and thereby data can not be exchanged normally. It is also known that such a situation occurs because there are various manufacturers and types of CF cards, and depending on the manufacturer and the type, the CF card does not support the communication speed which is supposed to be supported or there is a mismatch with a driver. However, in such a case, if this CF card cannot be used, the user is inconvenienced, which is undesirable. Such a problem can arise not only in the CF card but also in other types of data recording media.

Hence, in a sixth embodiment, even when data exchange at the fastest communication speed which is supposed to be supported fails, the data exchange with the same data recording medium can be realized by decreasing the communication speed, and the user's waiting tie when the data recording medium is accessed is reduced as short as possible. Portions different from those of the above fourth embodiment and fifth embodiment will be described below.

The hardware configuration of the information processing device 10 according to this embodiment is the same as that according to the above fourth embodiment and fifth embodiment. Namely, it is the same as that according to the above first embodiment. Card data transfer processing which is constantly performed by the information processing device 10 will be described using FIG. 28 and FIG. 29. This card data transfer processing is realized by the CPU 20 reading and executing a card data transfer processing program stored in the ROM 24 or the hard disk drive 26. This card data transfer processing is automatically started when the power of the information processing device 10 is turned on.

Figure 28:
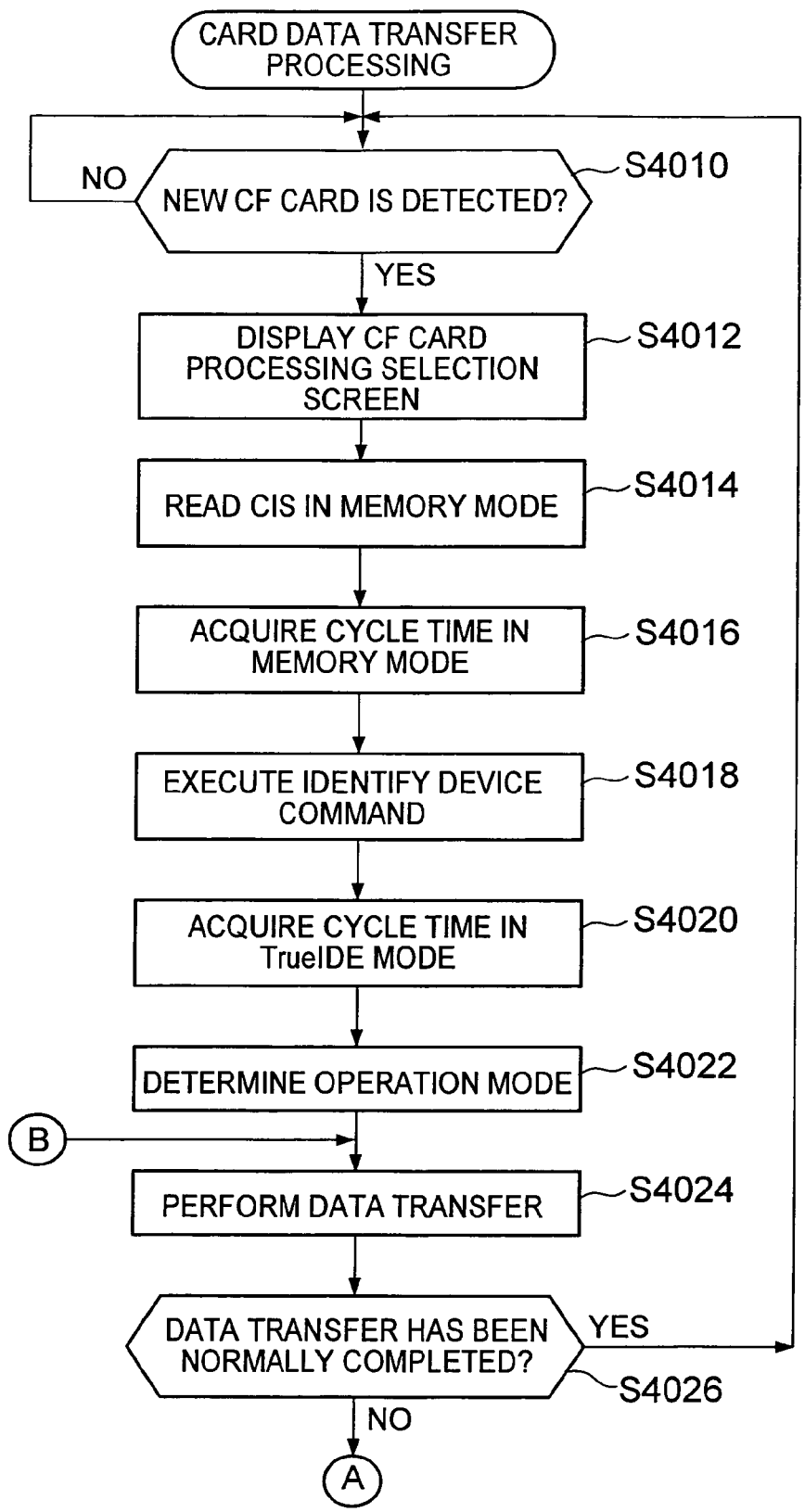
FIG. 28 is a flowchart for explaining an example of card data transfer processing according to a sixth embodiment performed by the information processing device shown in FIG. 1 (Part 1)

As shown in FIG. 28, the information processing device 10 judges whether the new CF card 50 is detected in the card slot 40 (step S4010). In this embodiment, based on the above card detection signal outputted from the card slot 40, it judges whether the new CF card 50 is inserted into the card slot 40.

More specifically, the information processing device 10 judges that the new CF card 50 is inserted into the card slot 40 when both the CD1 signal and the CD2 signal in the card clot 40 change from high to low. Further, in this embodiment, also when the information processing device 10 checks the CD1 signal and the CD2 signal in the card slot 40 when the power of the information processing device 10 itself is turned on and these CD1 signal and CD2 signal are low when the power is turned on, the information processing device 10 judges that the new CF card 50 is inserted into the card slot 40 since the CF card 50 is already inserted into the card slot 40. Namely, in this embodiment, while the CF card 50 is inserted, these CD1 signal and CD2 signal are low, and when the CF card 50 is not inserted, these CD1 signal and CD2 signal are high, whereby these CD1 signal and CD2 signal are used as the card detection signal.

When judging in step S4010 that the new CF card 50 is not detected (step S4010: NO), the information processing device 10 repeats step S4010 and stands by until the new CF card 50 is detected in the card slot 40.

On the other hand, when judging in step S4010 that the new CF card 50 is detected in the card slot 40 (step S4010: YES), the information processing device 10 displays a CF card processing selection screen W4010 such as shown in FIG. 30 on the display screen 34 (step s4012).

Figure 30:
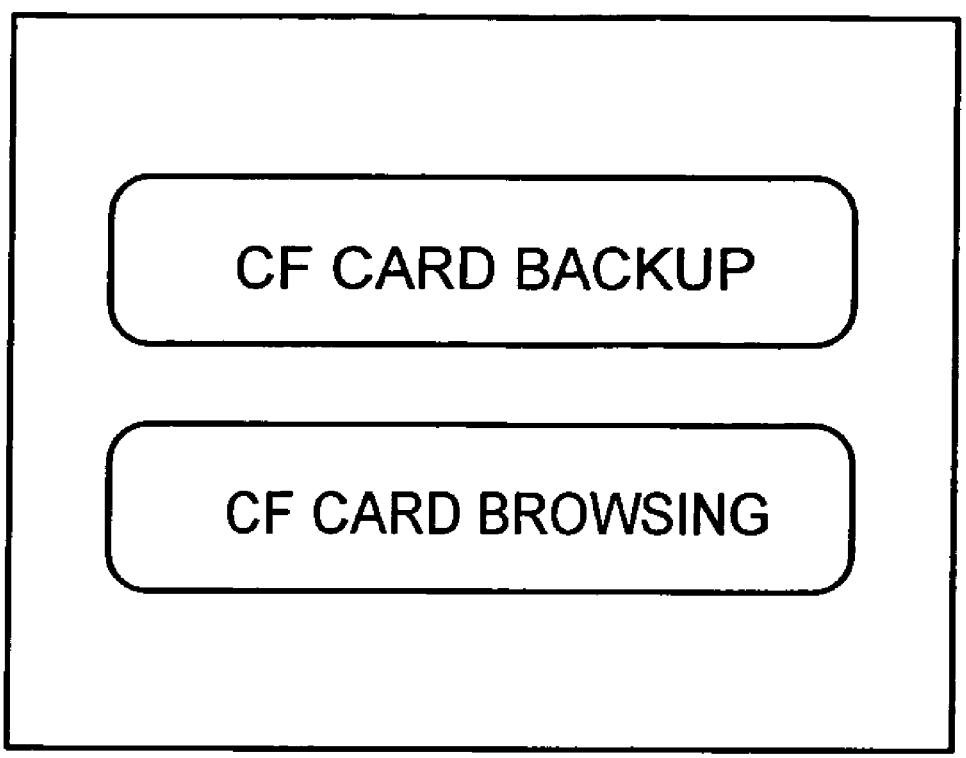
FIG. 30 is a diagram showing an example of a CF card processing selection screen displayed in a display screen of the information processing device in FIG. 1.

As can be seen from FIG. 30, on the CF card processing selection screen W4010 according to this embodiment, two options of "CF card backup" and "CF card browsing" are displayed. If "CF card backup" is selected, data stored in the CF card 50 is collectively transferred and backed up to the hard disk drive 26.

On the other hand, when "CF card browsing" is selected, instead of backing up data, information on the data stored in the CF card 50 is read, and a list of files is displayed on the display screen 34. The user selects a file of still image data, a file of moving image data, or a file of music data which the user wants to display from this list of files. In this embodiment, for example, if the file of still image data is selected, the selected image data stored in the CF card 50 is sequentially read and displayed on the display screen 34. If the file of moving image data is selected, the selected moving image data stored in the CF card 50 is read and displayed on the display screen 34. Alternatively, if the file of music data is selected, the selected music data stored in the CF card 50 is read and reproduced from a speaker 38. Needless to say, it is necessary to access the CF card 50 once in order to display the list of files.

The manipulation of selecting either "CF card backup" or "CF card browsing" and the manipulation of selecting a file of data from the list of files are performed by the user using the user interface 30.

When the user selects either "CF card backup" or "CF card browsing", the information processing device 10 accesses the CF card 50 in the memory mode and reads and acquires the CIS information as the card attribute information (step S4014).

Then, based on the read CIS information, the information processing device 10 checks and acquires a cycle time in the memory mode of the inserted CF card 50 (step S4016). Cycle times with a possibility of being supported by the CF card 50 in the memory mode are the same as those in FIG. 21 described above.

Subsequently, as shown in FIG. 28, the information processing device 10 executes the IdentifyDevice command (step S4018) and acquires a cycle time in the TrueIDE mode (step S4020). Namely, also in the TrueIDE mode, the supportable mode differs according to the type of the CF card 50, and the communication speed, that is, the cycle time differs according to the supportable mode. Hence, the information processing device 10 needs to check the supportable mode.

Generally, the TrueIDE mode includes three main types of transfer modes: PIO mode, Multiword DMA mode, and Ultra DMA mode. These three transfer modes have several modes according to supported speeds, respectively. In the information processing device 10 according to this embodiment, it is assumed that out of these three transfer modes, only the PIO mode is supported.

It is further assumed that the information processing device 10 according to this embodiment supports Revision 3.0 (CF+ and Compact Flash Specification Revision 3.0) as the latest revision of the PIO mode. Since in the Revision 3.0 PIO mode, PIO mode 0 to PIO mode 6 are defined, the information processing device 10 judges which of the PIO modes is supported by the inserted CF card 50.

The cycle times of mode 0 to mode 6 specifically defined in the PIO mode are the same as those in FIG. 22 described above. The information processing device 10 judges which of these modes is supported by the CF card 50 based on the read IdentifyDevice information and specifies the supported shortest cycle time.

Then, as shown in FIG. 28, the information processing device 10 selects a mode to be used for data transfer referring to the mode selection table TB3010 in FIG. 24 described above (step S4022). A method for selecting the operation mode at this time is also the same as that in step S3038 described above.

Subsequently, as shown in FIG. 28, the information processing device 10 performs data transfer in the operation mode determined in step S4022 (step S4024). Namely, if the user selects "CF card backup", data is transmitted from the CF card 50 to the hard disk drive 26 and backed up. On the other hand, if the user selects "CF card browsing", file information stored in the CF card 50 is read sequentially from this CF card 50 and transmitted as data from the CF card 50 to the information processing device 10, and the information processing device 10 displays a list of files.

Then, the information processing device 10 judges whether data transfer has been normally completed (step S4026). When judging that the data transfer has been normally completed (step S4026: YES), the information processing device 10 returns to step S4010 described above. Here, "the data transfer has been normally completed" means that backup of data from the CF card 50 to the hard disk drive 26 has been completed when the user selects "CF card backup". On the other hand, when the user selects "CF card browsing", it means that after file information stored in the CF card 50 is read sequentially from this CF card 50 and a list of files is displayed, the user selects one or plural files, and reading of these files has been completed.

On the other hand, when judging in step S4026 that the data transfer has not been normally completed (step S4026: NO), that is, data transmission has failed, the information processing device 10 judges whether the selection by the user is "CF card backup" (step S4030).

When the selection by the user is not "CF card backup" (step S4030: NO), that is, when the selection by user is "CF card browsing", without changing the operation mode determined in step S4022, the information processing device 10 changes its mode to the slowest mode of said operation mode (step S4032). Then, the information processing device 10 returns to step S4024 described above and performs data transfer. Namely, without changing the current operation mode, its mode is switched to a mode with the longest cycle time out of modes in which normal data exchange with the CF card 50 is possible.

One reason for switching to the mode with the longest cycle time is that the mode with the slowest communication speed has the highest possibility that data transfer can be normally performed. Another reason is that when the selection by the user is "CF card browsing", data read from the CF card 50 is only file information, so that its data amount is small and thereby the user's waiting time is hardly lengthened even if the communication speed becomes a little slower.

On the other hand, when judging in step S4030 that the selection by the user is "CF card backup" (step S4030: YES), the information processing device 10 acquires a cycle time in a mode one level slower than the current mode in the current operation mode (step S4034). Namely, if the current operation mode is the memory mode, a cycle time in the next lower mode is acquired in accordance with the table in FIG. 21. If the current operation mode is the TrueIDE mode, a cycle time in the next lower mode is acquired in accordance with the table in FIG. 22.

Then, the information processing device 10 acquires a cycle time in the fastest mode supported by the CF card 50 when the operation mode is changed (step S4036). Namely, if the current operation mode is the memory mode, it acquires a cycle time in a mode with the fastest communication speed out of modes in which normal data exchange with the CF card 50 is possible in accordance with the table of the TrueIDE mode shown in FIG. 22. If the current operation mode is the TrueIDE mode, it acquires a cycle time in a mode with the fastest communication speed out of modes in which normal data exchange with the CF card 50 is possible in accordance with the table of the memory mode shown in FIG. 21.

Incidentally, when in the processing until now, the operation mode has been already changed and data transfer has failed, it turns out that normal data transfer cannot be performed in a mode selected in this data transfer, so that the information processing device 10 excludes this mode with the communication speed at which the data transfer cannot be performed from candidates and acquires a cycle time in a mode one level slower than the mode in which the data transfer has failed.

Then, the information processing device 10 judges whether a data transfer rate when data transfer is performed in the next lower mode in the current operation mode acquired in step S4034 is faster than that when the operation mode is changed (step S4038). More specifically, based on the cycle time acquired in step S4034 and the cycle time acquired in step S4036, it searches the mode selection table in FIG. 24 and judges in which of operation modes, the data transfer rate is faster.

When judging that the data transfer rate when data transfer is performed in the next lower mode in the current operation mode is faster (step S4038: YES), without changing the operation mode, the information processing device 10 changes its mode to a one-level slower mode (step S4040), tries again data transfer (step S4024), and repeats the processing after step S4024.

On the other hand, when judging that the data transfer rate when data transfer is performed in the next lower mode in the current operation mode is not faster (step S4038: NO), that is, when judging that the communication speed when the operation mode is changed is faster, the information processing device 10 changes the operation mode and switches its mode to the mode with the cycle time acquired in step S4036 (step S4042). Then, it tries again data transfer (step S4024) and repeats the processing after step S4024.

As described above, in the information processing device 10 according to this embodiment, when data transfer has failed, whether the type of access selected by the user is backup of the CF card 50 or CF card browsing is checked, and in the case of the backup of the CF card 50, the communication speed in the next lower mode in the current operation mode and the communication speed in the mode supported when the operation mode is switched are compared, and data transfer is tried in the operation mode with the faster communication speed. Therefore, even when having failed in data exchange with the CF card 50 in a mode with the fastest communication speed, the information processing device 10 can select a mode with the fastest data transfer rate at which data can be normally exchanged with the CF card 50. Consequently, the user's waiting time in backup can be reduced as short as possible.

For example, a representative example of the large-capacity CF card 50 which has recently become mainstream is a 4-Gbyte CF card 50, and when data in this 4-Gbyte CF card 50 is backed up to the hard disk drive 26, approximately 10 minutes are needed even in the fastest mode. Needless to say, in a mode with a data transfer rate slower than the above mode, the time needed for backup increases. Therefore, it is thought that even if it takes some time to select the operation mode and select the data transfer mode, the overall time required for backup is shortened if the mode with the faster communication speed even if only slightly is selected.

In contrast, when the selection by the user is CF card browsing, the amount of transferred data is small, and if the operation mode is switched, the power of the CF card 50 needs to be temporarily turned off, and the user's waiting time corresponding thereto occurs, so that it is inadvisable to switch the operation mode. Instead, since it is conceivable that the user is waiting to see a list of files stored in the CF card 50 as soon as possible, without changing the operation mode, the mode is changed to a mode in which the most normal data transfer is highly possible, that is, a mode with the slowest communication speed out of modes in which normal data exchange is possible. Therefore, in the information processing device 10 according to this embodiment, a list of files of the CF card 50 can be displayed without keeping the user waiting for the time required to switch the operation mode.

Here, the modes in which and the communication speeds at which normal data exchange with the CF card 50 is possible mean modes and communication speeds supported by the inserted CF card 50. For example, if the inserted CF card 50 supports, in the memory mode, modes with cycle times of 80 ns, 100 ns, and 120 ns but does not support modes with longer cycle times of 150 ns and 250 ns, the modes of 150 ns and 250 ns are, of course, not included in candidates for selection. Namely, the modes in which normal data exchange with the CF card 50 is possible are three modes with cycle times of 80 ns, 100 ns, and 120 ns.

It should be mentioned that the present invention is not limited to the above embodiments, and various changes may be made therein. For example, in the above embodiments, the description is given with the CF card (Compact Flash card (registered trademark)) as an example, but the present invention is also applicable to other types of card-type media. Namely, the present invention is applicable to card-type media which require a reduction in the fall time of the card power.

Further, the present invention is also applicable to various operation modes other than the above memory mode, TrueIDE mode, card I/O mode. Namely, since various operation modes are prepared according to the types of card-type media, the present invention is applicable according to the prepared operation modes. In particular, the present invention according to the above first embodiment is effective when the supply of the card power needs to be temporarily stopped when the operation mode is switched.

Furthermore, the present invention according to the third embodiment and the fourth embodiment is applicable to an information processing device which requires preprocessing before data is read from and written to the card-type medium. More specifically, the present invention is applicable when the information processing device has two or more different operation modes and exchanges data with card-type recording media with different communication speeds in these operation modes.

Moreover, in the above third embodiment and fourth embodiment, which of the communication speed in the memory mode and the communication speed in the TrueIDE mode is faster is judged based on the mode selection table TB3010 in FIG. 24, and the operation mode for data exchange is selected, but the operation mode for data exchange may be selected based on the respective acquired cycle times. Namely, as described above, between the memory mode and the TrueIDE mode, in the mode with a shorter cycle time, the communication speed is not necessarily faster, but generally in the mode with a shorter cycle time, the possibility that the communication speed is faster is high, so that it is also possible that if the cycle time in the memory mode is shorter, the memory mode is selected as the operation mode for data exchange, whereas if the cycle time in the TrueIDE mode is shorter, the TrueIDE mode is selected as the operation mode for data exchange. By so doing, the capacity in the ROM 24 or the hard disk drive 26 in which the mode selection table TB3010 is to be stored can be reduced. Accordingly, it is said that the method of judging which of the communication speeds is faster is arbitrarily changed.

Figure 29:
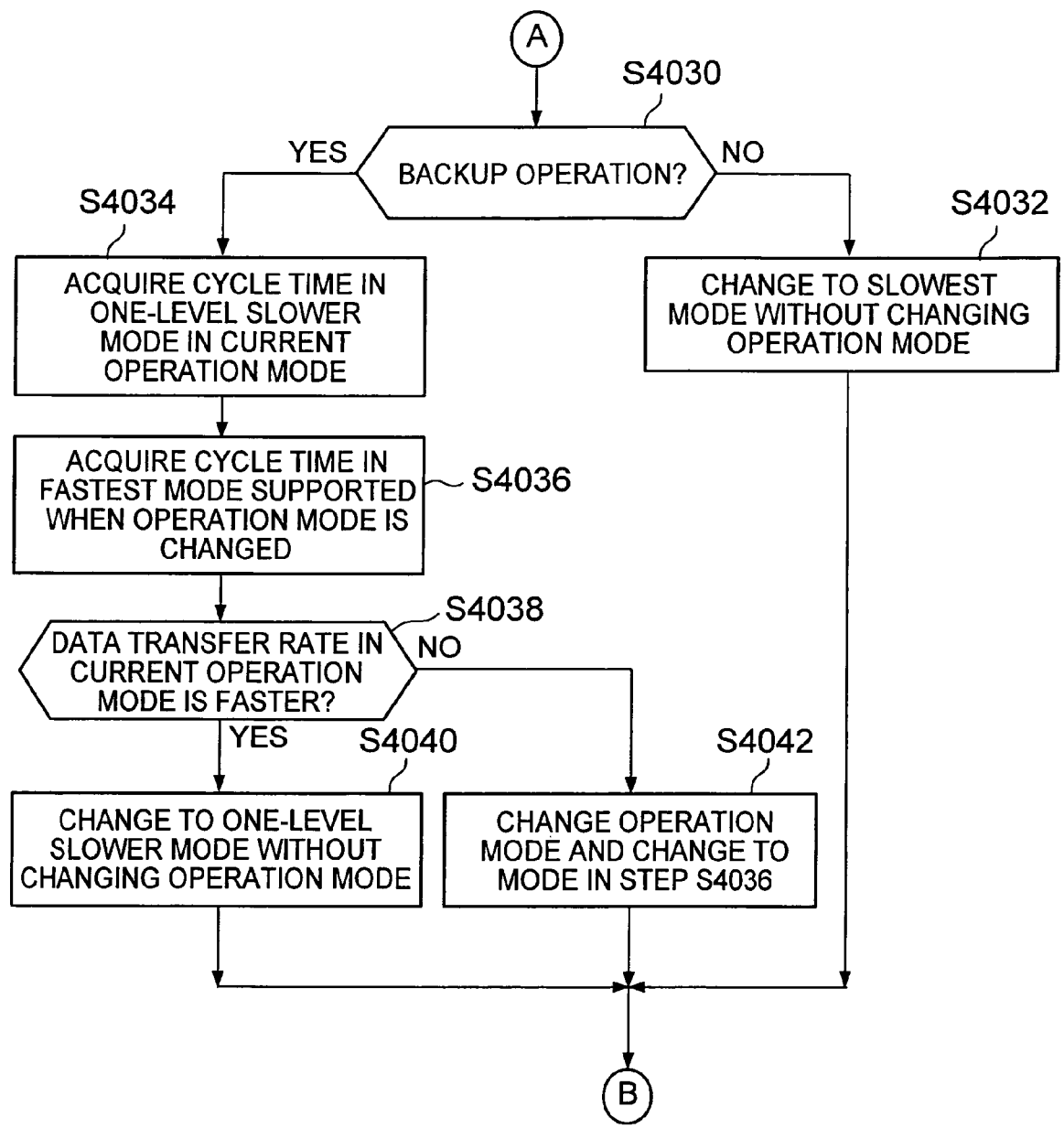
FIG. 29 is a flowchart for explaining the example of the card data transfer processing according to the sixth embodiment performed by the information processing device shown in FIG. 1 (Part 2)

Further, "CF card backup" in FIG. 30 of the sixth embodiment is an example of a type of access in which data is collectively exchanged between the information processing device 10 and the CF card 50, and in any other type of access being the type of access in which data is collectively exchanged, the processing from step S4034 to step 4042 shown in FIG. 29 may be performed.

Furthermore, "CF browsing" in FIG. 30 is an example of a type of access in which data is not collectively exchanged between the information processing device 10 and the CF card 50, and in any other type of access being the type of access in which data is not collectively exchanged, the processing in step 4032 shown in FIG. 29 may be performed.

Moreover, in the above embodiments, the present invention is described with the case where the selection by the user is the type of access in which data is transmitted from the CF card 50 to the information processing device 10 as an example, but the present invention is also applicable to a case where the selection by the user is the type of access in which data is transmitted from the information processing device 10 to the CF card 50. In other words, options displayed on the CF card processing selection screen in FIG. 30 can be arbitrarily changed according to the user's wishes or the specifications of the information processing device 10.

As concerns each processing explained in the above embodiments, it is possible to record a program to execute the processing on a recording medium such as a flexible disk, a CD-ROM (Compact Disc-Read Only Memory), a ROM, a memory card, or the like and distribute this program in the form of the recording medium. In this case, the above embodiments can be realized by making the information processing device 10 read and execute the program recorded on the recording medium.

Further, the information processing device 10 sometimes has other programs such as an operating system, other application programs, and the like. In this case, to utilize these other programs in the information processing device 10, a program including a command, which calls a program to realize processing equal to that in the above embodiments out of the programs in the information device 10, may be recorded on the recording medium.

Furthermore, such a program can be distributed not in the form of the recording medium but in the form of a carrier wave via a network. The program transmitted in the form of the carrier wave over the network is incorporated in the information processing device 10, and the above embodiments can be realized by executing this program.

Moreover, when being recorded on the recording medium or transmitted as the carrier wave over the network, the program is sometimes encrypted or compressed. In this case, the information processing device 10 which has read the program from these recording medium or carrier wave needs to execute the program after decrypting or expanding the program.

Additionally, in the above embodiments, each processing is realized by software, but may be realized by hardware such as an ASIC (Application Specific IC).

What is claimed is:

1. A control method of an information processing device comprising a data recording medium accessor, into which a data recording medium is inserted to access the inserted data recording medium, the data recording medium having a first operation mode and a second operation mode as operation modes, the first operation mode having one or plural communication speeds and the second operation mode having one or plural communication speeds, the control method comprising the steps of:

causing a user to select an access type to access the data recording medium inserted into the data recording medium accessor;

accessing the data recording medium to execute the access type selected by the user in an operation mode having a faster communication speed out of the first operation mode and the second operation mode;

if the access to the data recording medium has failed and if the access type selected by the user is a type in which data is collectively exchanged, selecting a fastest communication speed out of communication speeds at which there is a possibility that data is correctly exchanged in the first operation mode and the second operation mode, and accessing the data recoding medium to execute the access type selected by the user at the selected communication speed in one of the first operation mode and the second operation mode again; and if the access to the data recording medium has failed and if the access type selected by the user is not the type in which data is collectively exchanged, reducing the communication speed in the current operation mode, and accessing the data recording medium to execute the access type selected by the user at the reduced communication speed in the current operation mode again.

2. The control method of the information processing device according to claim 1, wherein in the step of reducing the communication speed, the communication speed is reduced to a slowest communication speed out of communication speeds at which there is a possibility that data is correctly exchanged in the current operation mode.

3. The control method of the information processing device according to claim 1, further comprising the step of, when the access to the data recording medium has failed again and if the access selected by the user is the type in which data is collectively exchanged, judging that there is no possibility that the data is correctly exchanged at the selected communication speed, excluding this communication speed from candidates, thereafter selecting a fastest communication speed out of the communication speeds at which there is a possibility that data is correctly exchanged in the first cooperation mode and the second operation mode, and accessing the data recording medium to execute the access type selected by the user again.

4. The control method of the information processing device according to claim 1, wherein in the step of causing the user to select the access type, for access types to be selected by the user, there are at least backup of data recorded on the data recording medium as the access type in which data is collectively exchanged, and browsing of data recorded on the recording medium as the access type in which data is not collectively exchanged.

5. The control method of the information processing device according to claim 1, wherein the step of accessing the data recording medium to execute the access type selected by the user at the fastest communication speed in one of the first operation mode and the second operation mode comprises the step of:

acquiring communication speeds at which there is a possibility that data is correctly exchanged in the first operation mode and communication speeds at which there is a possibility that data is correctly exchanged in the second operation mode by accessing the data recording medium; and selecting one of the first operation mode and the second operation mode based on which one has a fastest communication speed out of these acquired communication speeds.

6. The control method of the information processing device according to claim 1, wherein the data recording medium is a card-type recording medium removably inserted into the data recording medium accessor, and the data recording medium accessor is a card slot into which the card-type recording medium is inserted.

7. The control method of the information processing device according to claim 6, wherein the card-type recording medium is a compact flash card.

8. The control method of the information processing device according to claim 7, wherein the first operation mode is a memory mode, and the second operation mode is a TrueIDE mode.

9. An information processing device, comprising:

a data recording medium accessor, into which a data recording medium is inserted to access the inserted data recording medium, the data recording medium having a first operation mode and a second operation mode as operation modes, the first operation mode having one or plural communication speeds and the second operation mode having one or plural communication speeds;

a selector which causes a user to select an access type to access the data recording medium inserted into the data recording medium accessor;

a first accessor which accesses the data recording medium to execute the access type selected by the user in an operation mode having a faster communication speed out of the first operation mode and the second operation mode;

a second accessor which, if the access by the first accessor has failed and if the access type selected by the user in the selector is a type in which data is collectively exchanged, selects a fastest communication speed out of communication speeds at which there is a possibility that data is correctly exchanged in the first operation mode and the second operation mode, the second accessor accessing the data recoding medium to execute the access type selected by the user at the selected communication speed in one of the first operation mode and the second operation mode again; and a third accessor which, if the access by the first accessor has failed and if the access type selected by the user in the selector is not the type of access in which data is collectively exchanged, reduces the communication speed in the current operation mode, the third accessor accessing the data recording medium to execute the access type selected by the user at the reduced communication speed in the current operation mode again.

* * * * *